US010575341B2

(12) United States Patent
Watanabe

(10) Patent No.: US 10,575,341 B2
(45) Date of Patent: Feb. 25, 2020

(54) COMMUNICATION SYSTEM AND RECORDING MEDIUM

(71) Applicant: Kiwamu Watanabe, Kanagawa (JP)

(72) Inventor: Kiwamu Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 295 days.

(21) Appl. No.: 15/222,105

(22) Filed: Jul. 28, 2016

(65) Prior Publication Data

US 2017/0041965 A1 Feb. 9, 2017

(30) Foreign Application Priority Data

Aug. 3, 2015 (JP) .................. 2015-153696

(51) Int. Cl.
H04W 76/10 (2018.01)
H04W 12/06 (2009.01)
H04W 76/16 (2018.01)
H04W 84/12 (2009.01)

(52) U.S. Cl.
CPC ........... *H04W 76/10* (2018.02); *H04W 12/06* (2013.01); *H04W 76/16* (2018.02); *H04W 84/12* (2013.01)

(58) Field of Classification Search
None
See application file for complete search history.

(56) References Cited

U.S. PATENT DOCUMENTS

2008/0016556 A1 1/2008 Selignan
2008/0032736 A1 2/2008 Bari et al.
2010/0099455 A1 4/2010 Bari et al.
2010/0311330 A1* 12/2010 Aibara .............. H04W 36/0055 455/41.2
2014/0094117 A1* 4/2014 Rajendran ............. H04W 12/04 455/41.1

(Continued)

FOREIGN PATENT DOCUMENTS

JP 2005-523489 A 8/2005
JP 2010-500791 A 1/2010

(Continued)

*Primary Examiner* — Fatoumata Traore
(74) *Attorney, Agent, or Firm* — Oblon, McClelland, Maier & Neustadt, L.L.P.

(57) ABSTRACT

A communication system includes: a terminal device; and a communication device. The communication device includes: a first communication unit configured to perform communication with the terminal device through first wireless communication based on connection information; a second communication unit configured to perform communication via a network; and a connection control unit configured to permit the terminal device, which performs communication with the first communication unit based on the connection information, to connect to the network via the second communication unit. The terminal device includes: a third communication unit configured to perform the first wireless communication; a fourth communication unit configured to perform second wireless communication having a communication range smaller than the first wireless communication; and a communication control unit configured to cause the third communication unit to transmit the connection information received by the fourth communication unit, to the first communication unit.

6 Claims, 17 Drawing Sheets

(56) References Cited

U.S. PATENT DOCUMENTS

| | | | | |
|---|---|---|---|---|
| 2014/0176980 A1* | 6/2014 | Asai | ......................... | H04W 4/80 |
| | | | | 358/1.13 |
| 2014/0187163 A1* | 7/2014 | Fujita | .................... | H04W 36/36 |
| | | | | 455/41.2 |
| 2015/0078362 A1* | 3/2015 | Kunieda | ............... | H04W 76/19 |
| | | | | 370/338 |
| 2015/0264650 A1* | 9/2015 | Sekine | .............. | H04W 52/0274 |
| | | | | 370/311 |
| 2016/0001581 A1* | 1/2016 | Ito | ........................... | B41J 29/13 |
| | | | | 347/19 |

FOREIGN PATENT DOCUMENTS

| | | |
|---|---|---|
| JP | 4913209 B2 | 1/2012 |
| JP | 2015-84515 A | 4/2015 |
| JP | 2016-105576 A | 6/2016 |
| JP | 2016-212566 A | 12/2016 |
| WO | WO 03/019389 A1 | 3/2003 |

* cited by examiner

COMMUNICATION SYSTEM AND RECORDING MEDIUM

CROSS-REFERENCE TO RELATED APPLICATIONS

The present application claims priority under 35 U.S.C. § 119 to Japanese Patent Application No. 2015-153696, filed Aug. 3, 2015. The contents of which are incorporated herein by reference in their entirety.

BACKGROUND OF THE INVENTION

1. Field of the Invention

The present invention relates to a communication system and a recording medium.

2. Description of the Related Art

In recent years, generally within organizations, such as corporations, local area networks (LANs) including wireless LANs are constructed, and devices, such as information devices used in the organizations, multi-function printers (MFPs), and projectors, are connected to one another via the LANs. To such an intra-organization LAN constructed within an organization, a guest terminal, which is an information device outside the organization, is sometimes connected. For such a case, a technique is known, where: when a guest terminal is to be connected, authentication processing is performed by a service Set Identifier (SSID) identifying an access point being input or selected from the guest terminal; and when authentication succeeds, each device connected to an intra-organization LAN is enabled to be used from the guest terminal.

As techniques for facilitating authentication processing in wireless LAN connection, Wi-Fi (registered trademark) Protected Setup (WPS) and AirStation One-Touch Secure System (AOSS, registered trademark) are known. Further, in Japanese Patent No. 4913209, a technique is disclosed, where in a LAN including one or more access points and access control functions for controlling access to the LAN, a dedicated emergency SSID for permitting access to the LAN in case of emergency is defined, and the access control functions permit data packets from a terminal device associated with the selected emergency SSID to enter the LAN.

However, an SSID is an arbitrarily set piece of information of 32 characters, and there has been a problem that an SSID, which is to be input or selected from a guest terminal when the guest terminal is connected to an intra-organization LAN, is difficult to be easily specified.

For example, in an environment where an access point is installed in each of rooms adjacent to one another, specifying, based only on SSIDs of the respective access points, an access point, to which a guest terminal desires to be connected, is difficult for a user of the guest terminal. Further, although an access point list may be generated by the guest terminal scanning the SSIDs, in this method also, retrieving and selecting a specific access point from the list is not a simple setting method for the user.

This problem of the easy setting of a desired access point from plural access points being difficult cannot be solved by Japanese Patent No. 4913209, either.

SUMMARY OF THE INVENTION

According to one aspect of the present invention, a communication system includes a terminal device and a communication device. The communication device includes a first communication unit, and a second communication unit, a connection control unit. The first communication unit is configured to perform communication with the terminal device through first wireless communication based on connection information. The second communication unit is configured to perform communication via a network. The connection control unit is configured to permit the terminal device, which performs communication with the first communication unit based on the connection information, to connect to the network via the second communication unit. The terminal device includes a third communication unit, a fourth communication unit and a communication control unit. The third communication unit is configured to perform the first wireless communication. The fourth communication unit is configured to perform second wireless communication having a communication range smaller than the first wireless communication. The communication control unit is configured to cause the third communication unit to transmit the connection information received by the fourth communication unit, to the first communication unit.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
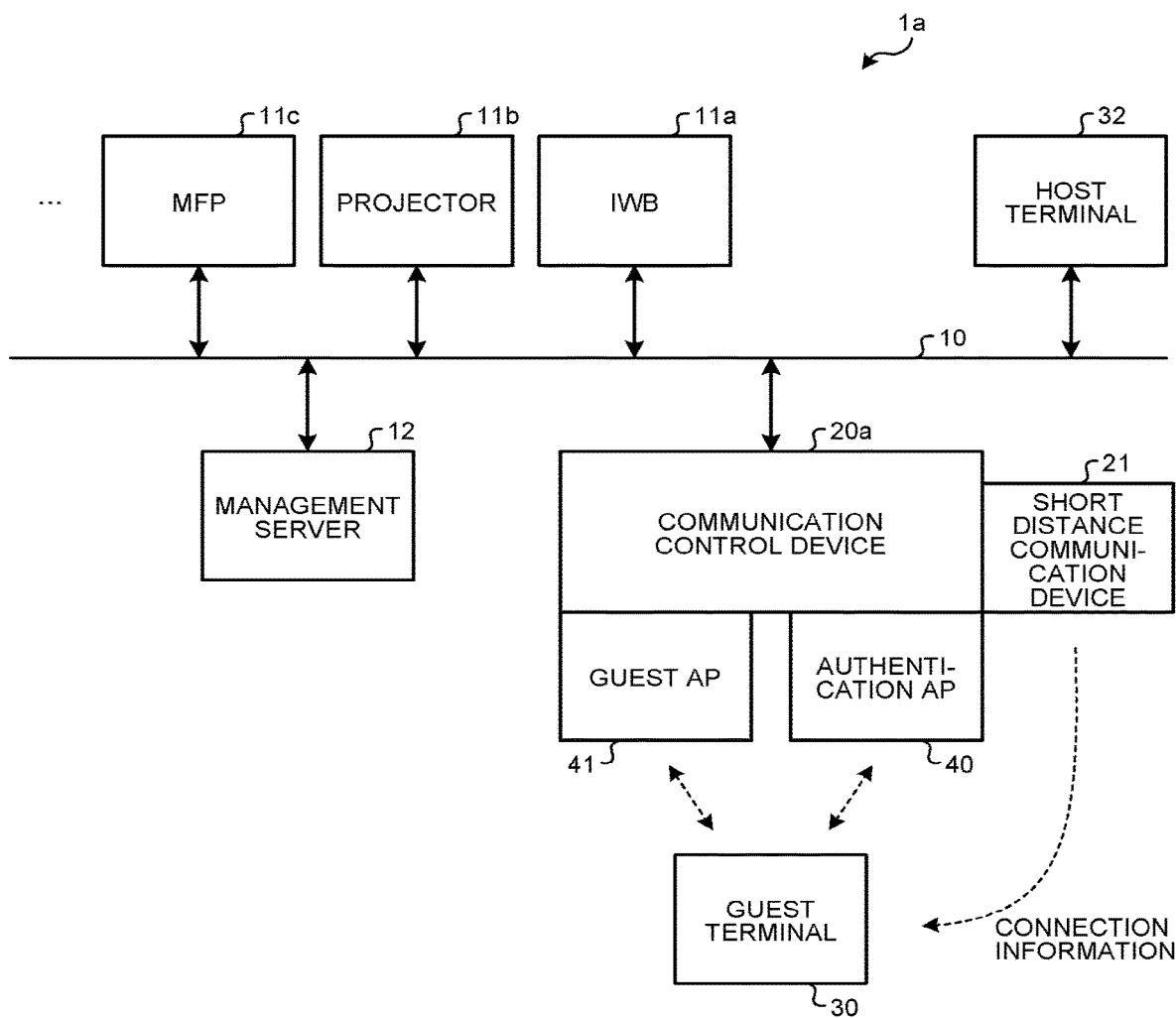
FIG. 1 is a block diagram illustrating a configuration of an example of a network system applicable to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Hereinafter, with reference to the appended drawings, embodiments of a communication system and a recording medium will be described in detail.

An embodiment has an object to enable easy connection to a specific access point of plural access points.

First Embodiment

FIG. 1 illustrates a configuration of an example of a network system applicable to a first embodiment. In FIG. 1, a network system 1a includes: information devices 11a, 11b, 11c, . . . ; a management server 12; a communication control device 20a; and a host terminal 32, and is configured such that the information devices 11a, 11b, 11c, . . . , the communication control device 20a, and the host terminal 32 are connected to a network 10 to be communicatable with one another.

To the communication control device 20a, an authentication access point (AP) 40 and a guest AP 41 are connected. The authentication AP 40 and guest AP 41 are each accessed by the guest terminal 30 through wireless communication. The authentication AP 40 and guest AP 41 may be devices connected to the communication control device 20a via a cable, or may be configured as dongles used by directly being connected to connecters of an interface, such as the Universal Serial Bus (USB) that the communication control device 20a includes.

Further, a short distance communication device 21 is provided to the communication control device 20a. The short distance communication device 21 performs wireless communication by a communication method having a communication range smaller than a wireless LAN. For example, as the communication method of the short distance communication device 21, Bluetooth (registered trademark) is applicable, which is a communication standard for performing wireless communication over a comparatively short distance, such as within several meters. In Bluetooth (registered trademark), three types of classes having different reachable distances of radio waves are prescribed, and criterions of the reachable distances of radio waves for the respective classes are: one meter at most for Class 3, ten meters at most for Class 2, and 100 meters at most for Class 1. In the first embodiment, for example, Bluetooth (registered trademark) of Class 3 is preferably applied to the short distance communication device 21.

In the first embodiment, the short distance communication device 21 does not perform communication with the communication control device 20a. Thus, the short distance communication device 21 is not required to be attached to the communication control device 20a, and may just be near the communication control device 20a. For example, the short distance communication device 21 may be configured as a USB dongle and attached to a USB connector that the communication control device 20a includes, and only power may be supplied thereto from the communication control device 20a via this USB connector.

The communication method applicable to the short distance communication device 21 is not limited to Bluetooth (registered trademark), and may be any other communication method, as long as the communication method has directivity and a communication range that are limited compared with the wireless LAN. For example, as the communication method of the short distance communication device 21, near field radio communication (NFC), where communication of a very short distance of about several centimeters to one meter is performed, is applicable. Infrared communication may be applied as the communication method of the short distance communication device 21. Further, as the communication method of the short distance communication device 21, a communication method using sound waves, visible light, or the like, may be also applied.

Furthermore, the short distance communication device 21 includes a read only memory (ROM) prestoring therein later described connection information for connecting the guest terminal 30 to the authentication AP 40, and broadcasts the connection information stored in the ROM through short distance wireless communication.

The network 10 is a network system where communication is performed by use of a protocol, for example, the Transmission Control Protocol/Internet Protocol (TCP/IP), and is an intra-organization LAN having a configuration closed within an organization, such as a corporation. The management server 12 manages information of a user connectable to the network 10, and information of the respective information devices 11a, 11b, 11c, . . . connected to the network 10. The user information managed by the management server 12 includes at least a user name and a password. The user, of which the user information has been registered in the management server 12, will hereinafter be referred to as "host user". Further, the device information managed by the management server 12 includes at least names given to the devices, IP addresses of the devices on the network 10, and information indicating types of the devices.

In the example of FIG. 1, the information devices 11a, 11b, and 11c are respectively an interactive whiteboard (IWB), a projector, and a multi-function printer (MFP). Information devices connected to the network 10 are not limited to these IWB, projector, and MFP.

The authentication AP 40 and guest AP 41 are, for example, access points in the wireless LAN conforming to the Institute of Electrical and Electronics Engineers (IEEE) 802.11 standard. Hereinafter, this wireless LAN conforming to the IEEE 802.11 standard will be referred to as "Wi-Fi (registered trademark)", which is a name certifying inter-connectivity according to Wi-Fi (registered trademark) Alliance, which is an industry organization related to IEEE 802.11 devices.

The authentication AP 40 is an access point connectable without execution of authentication processing, such as exchange of an encryption key in connection through Wi-Fi (registered trademark). In contrast, the guest AP 41 is an access point, to which only a terminal device authenticated by authentication processing is able to connect through Wi-Fi (registered trademark). For example, the guest AP 41 performs communication of information encrypted according to an encryption scheme of Wi-Fi Protected Access (WPA)2 Personal (registered trademark) recommended by Wi-Fi Alliance (registered trademark).

The guest terminal 30 is unable to perform communication with the network 10 through the communication via the authentication AP 40. Via the guest AP 41, the guest terminal 30 is able to perform communication with the network 10. That is, the guest AP 41 is a first communication unit that performs communication with the guest terminal 30 through the wireless LAN.

The host terminal 32 is a terminal device used by the host user, and the guest terminal 30 is a terminal device used by a user outside the organization (hereinafter, referred to as "guest user"). The guest terminal 30 includes a short distance wireless communication means corresponding to the communication method applied to the short distance communication device 21, and establishes, based on the connection information transmitted from the short distance communication device 21, connection with the authentication AP 40. Further, the communication control device 20a controls the connection of the guest terminal 30 to the network 10.

In the above described configuration, when the guest terminal 30 desires to perform communication with the network 10, firstly, the guest terminal 30 receives the connection information transmitted from the short distance communication device 21, and establishes, based on the received connection information, connection with the authentication AP 40. When the connection with the authentication AP 40 is established, the guest terminal 30 communicates with the network system 1a via this authentication AP 40 to perform authentication processing. If authentication by this authentication processing succeeds, the guest terminal 30 is able to perform communication with the network 10 through communication via the guest AP 41.

More specifically, the guest terminal 30 firstly uses the short distance wireless communication means that the guest terminal 30 includes, to receive the connection information transmitted from the short distance communication device 21. The connection information includes, for example, a Service Set Identifier (SSID) of the authentication AP 40. Using the received connection information, the guest terminal 30 establishes connection with the authentication AP 40 through the wireless LAN.

When the connection with the authentication AP 40 through the wireless LAN is established, the guest terminal 30 performs communication with the communication control device 20a via the authentication AP 40. In response to this communication, the communication control device 20a transmits, to the guest terminal 30, an authentication screen for inputting authentication information. At the guest terminal 30, the guest user operating the guest terminal 30 inputs predetermined authentication information on this authentication screen, and transmits the input authentication information to the communication control device 20a via the authentication AP 40.

The communication control device 20a transmits the authentication information transmitted from the guest terminal 30, to the host terminal 32. The host terminal 32 causes a display device to display the authentication information transmitted from the communication control device 20a. The host user using the host terminal 32 checks the display of this authentication information and performs, on the host terminal 32, operation of authenticating the guest terminal 30. In response to this operation, the host terminal 32 transmits an authentication result to the communication control device 20a. In response to this authentication result, the communication control device 20a is brought into a state of being able to obtain the connection information for connecting to the guest AP 41 from the guest terminal 30.

By obtaining the connection information from the communication control device 20a, the guest terminal 30 is enabled to perform communication with the guest AP 41, and thereby, is enabled to perform communication with the network 10 via the guest AP 41. For example, the guest terminal 30 is able to perform communication with the respective information devices 11a, 11b, 11c, . . . via the network 10 and cause the respective information devices 11a, 11b, and 11c to execute display, printing, or the like of images.

More Specific Configuration According to First Embodiment

Figure 2:
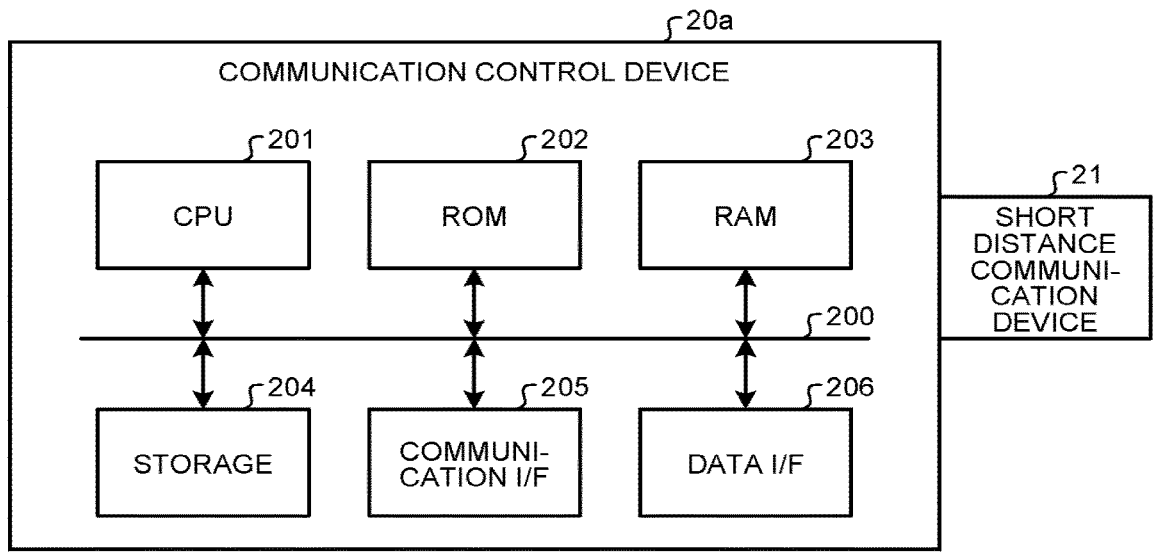
FIG. 2 is a block diagram illustrating a configuration of an example of a communication control device applicable to the first embodiment.

FIG. 2 illustrates a configuration of an example of the communication control device 20a applicable to the first embodiment. In FIG. 2, the communication control device 20a includes a central processing unit (CPU) 201, a read only memory (ROM) 202, a random access memory (RAM) 203, a storage 204, a communication I/F 205, and a data I/F 206, which are communicatably connected to one another via a bus 200. The storage 204 is a storage medium that is able to non-volatilely store therein information, and a hard disk drive or a non-volatile semiconductor memory (such as a flash memory) may be used as the storage 204.

The CPU 201 uses the RAM 203 as a work memory to control operation of the whole communication control device 20a, according to a computer program prestored in the storage 204 or ROM 202. The communication I/F 205 controls the communication with the network 10 according to instructions of the CPU 201. The data I/F 206 is an interface for performing transmission and reception of data to and from other devices, and for example, Universal Serial Bus (USB) is applicable thereto. Besides, an interface, which performs data transmission and reception through wireless communication targeting a comparatively short distance, such as Bluetooth (registered trademark), may be used as the data I/F 206.

The communication control device 20a may be configured using a general computer, as described above. Of course, the communication control device 20a may further include an input device for receiving user input, or a display device that presents information to a user. Further, not being limited to the configuration with a single computer, the communication control device 20a may be configured by operating plural computers in a distributed manner.

The authentication AP 40 and guest AP 41 are connected, for example, to the data I/F 206. For example, the authentication AP 40 and guest AP 41 may be configured as USB dongles, and connected to the data I/F 206. In that configuration, the authentication AP 40 and guest AP 41 may be each configured of independent hardware or configured of common hardware. If the authentication AP 40 and guest AP 41 are configured of common hardware, functions of the authentication AP 40 and guest AP 41 may be switched over by a computer program operating on the CPU 201. Further, each of the authentication AP 40 and guest AP 41 may be connected to the communication I/F 205.

The short distance communication device 21 is arranged, for example, near the communication control device 20a, and does not perform communication with each component inside the communication control device 20a. Besides, if the short distance communication device 21 is configured to be connectable by USB and the data I/F 206 includes a USB connector with a power supplying function, the short distance communication device 21 may be connected to this USB connector and power may be supplied to the short distance communication device 21. Further, the short distance communication device 21 may be provided inside the communication control device 20a.

Figure 3:
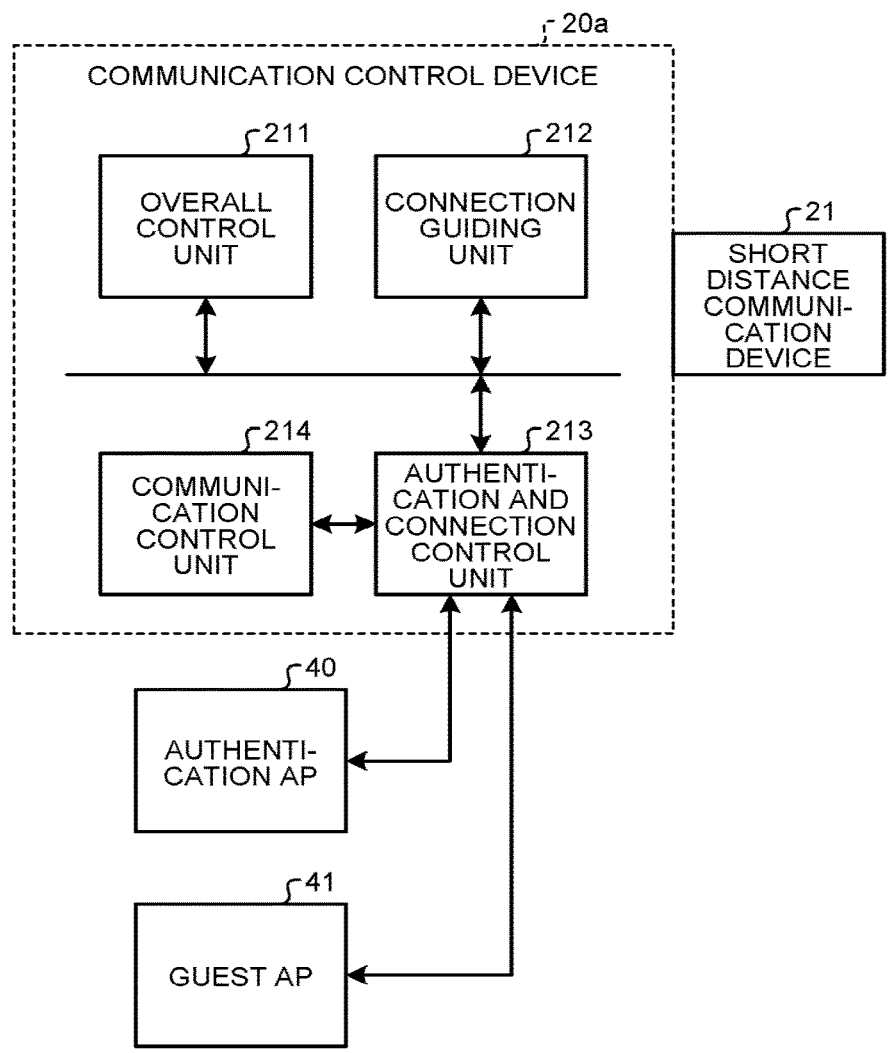
FIG. 3 is a functional block diagram of an example for explanation of functions of the communication control device according to the first embodiment.

FIG. 3 is a functional block diagram illustrating an example for explanation of functions of the communication control device 20a according to the first embodiment. In FIG. 3, the communication control device 20a includes an overall control unit 211, a connection guiding unit 212, an authentication and connection control unit 213, and a communication control unit 214. These overall control unit 211, connection guiding unit 212, authentication and connection control unit 213, and communication control unit 214 are configured by a computer program operating on the CPU 201. Besides, a part or all of the overall control unit 211, connection guiding unit 212, authentication and connection control unit 213, and communication control unit 214 may be configured of hardware that operates in mutual cooperation.

In the first embodiment, the short distance communication device 21 is independent of each function of the communication control device 20a.

The overall control unit 211 controls respective functions of the communication control device 20a as a whole. The connection guiding unit 212 forcibly guides communication to an arbitrary address (Uniform Resource Locator (URL)) to a specific address. The arbitrary address includes an address of each of the information devices 11a, 11b, 11c, . . . on the network 10. A known captive portal technique may be applied to the connection guiding unit 212. The captive portal is a technique that forces reference to a specific Web site on a network when a Hypertext Transfer Protocol (HTTP) client uses the network.

Further, the connection guiding unit 212 includes functions of Dynamic Host Configuration Protocol (DHCP) and is able to assign an IP address to a targeted device or the like in response to a request.

The communication control unit 214 is a second communication unit that controls communication by the communication I/F 205. The authentication and connection control unit 213 includes functions as a connection control unit that performs communication path control between the communication control unit 214 and the authentication AP 40 and guest AP 41. Further, the authentication and connection control unit 213 includes functions as an authentication unit that controls authentication processing executed via the authentication AP 40.

These overall control unit 211, connection guiding unit 212, authentication and connection control unit 213, and communication control unit 214 are, for example, stored on the storage 204, and realized by a communication program operating on the CPU 201. This communication program is recorded on a computer readable recording medium, such as a compact disk (CD), a flexible disk (FD), or a digital versatile disk (DVD), as a file of an installable format or executable format, to provide the communication program.

Furthermore, the communication program executed by the communication control device 20a of the first embodiment may be configured to be stored on a computer connected to a network, such as the Internet, and downloaded via the network to provide the communication program. Moreover, the computer program executed by the communication control device 20a of the first embodiment may be configured to be provided or distributed via a network, such as the Internet. In addition, the communication program of the first embodiment may be configured to be incorporated in the ROM 202 or the like in advance to provide the communication program.

What is more, the communication control device 20a may be installed with a browser application (hereinafter, referred to as "browser") for browsing of information on a network, for example, and the respective functions of the connection guiding unit 212, authentication and connection control unit 213, and communication control unit 214 may be realized on this browser. For example, the browser may realize the functions of these connection guiding unit 212, authentication and connection control unit 213, and communication control unit 214 according to a computer program provided from a server accessed by the communication control device 20a via a network. The overall control unit 211 corresponds to functions realized on an operating system (OS), which is a computer program that controls the overall operation of this communication control device 20a.

The communication program executed by the communication control device 20a of the first embodiment has a module configuration including each unit described above (the overall control unit 211, connection guiding unit 212, authentication and connection control unit 213, and communication control unit 214). As to actual hardware, by the CPU 201 reading and executing the communication program from the storage medium, such as the storage 204 or ROM 202, each unit described above is loaded on a main storage device, such as the RAM 203, and the overall control unit 211, connection guiding unit 212, authentication and connection control unit 213, and communication control unit 214 are generated on the main storage device.

Figure 4:
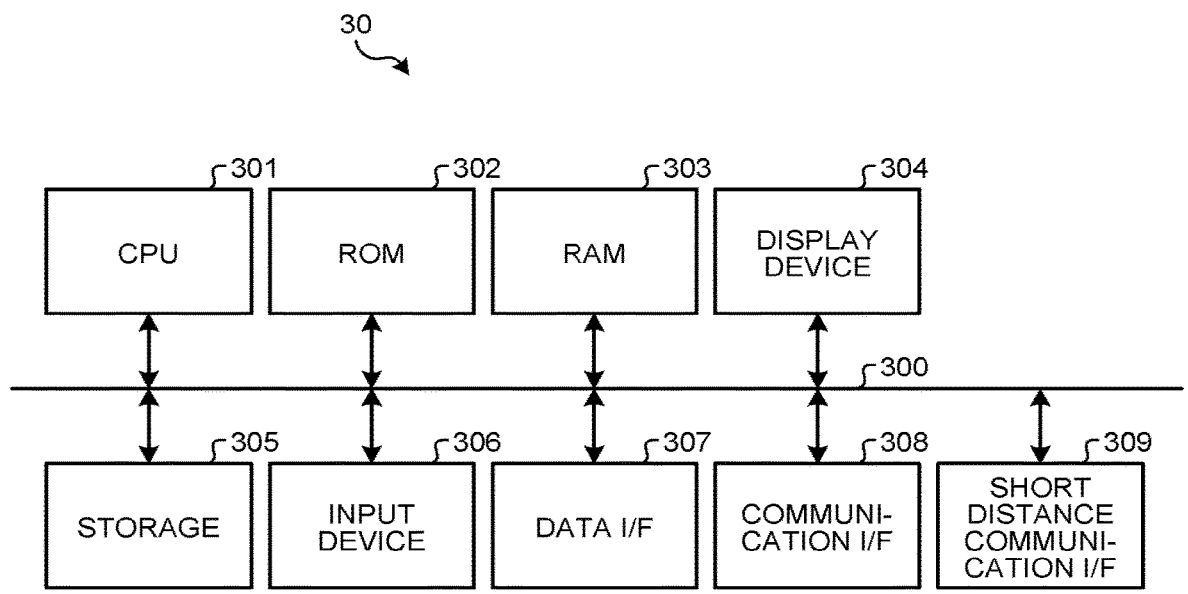
FIG. 4 is a block diagram illustrating a configuration of an example of a guest terminal applicable to the first embodiment.

FIG. 4 illustrates a configuration of an example of the guest terminal 30 applicable to the first embodiment. The guest terminal 30 is configured of, for example, a general computer, includes a CPU 301, a ROM 302, a RAM 303, a display device 304, a storage 305, an input device 306, a data I/F 307, a communication I/F 308, and a short distance communication I/F 309, which are communicatably connected to one another by a bus 300. The storage 305 is a storage medium, such as, for example, a hard disk drive or a flash memory, which is able to store therein information non-volatilely. The CPU 301 uses the RAM 303 as a work memory to control the overall operation of this guest terminal 30, according to a computer program prestored in the storage 305 or ROM 302.

The display device 304 includes a display element of, for example, liquid crystal display (LCD), and a driving unit that drives the display element according to display control signals generated by the CPU 301. The input device 306 is, for example, a touch panel integrally formed with the display device 304, and includes an input element that outputs a signal according to a position contacted by a hand or finger, and an input control unit that converts the signal output from the input element to information interpretable by the CPU 301. The input device 306 may be formed of a pointing device, such as a mouse, and a keyboard, not being limited to the touch panel.

The data I/F 307 is an interface for performing transmission and reception of data to and from an external device, and for example, Universal Serial Bus (USB) is applicable thereto. The communication I/F 208 controls wireless communication by Wi-Fi (registered trademark) according to instructions of the CPU 301. According to instructions of the CPU 301, the short distance communication I/F 309 controls short distance wireless communication by a communication method corresponding to the above described communication method of the short distance communication device 21.

Since the host terminal 32 is able to be realized by a configuration with the short distance communication device 21 omitted from the guest terminal 30, description thereof will be omitted.

Figure 5:
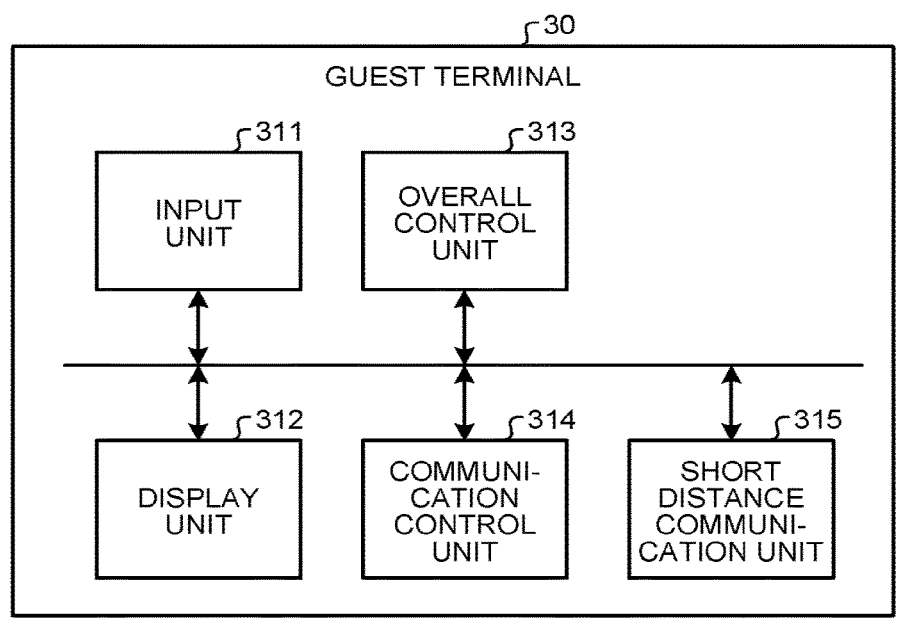
FIG. 5 is a functional block diagram illustrating an example for explanation of functions of the guest terminal according to the first embodiment.

FIG. 5 is a functional block diagram illustrating an example for explanation of functions of the guest terminal 30 according to the first embodiment. In FIG. 5, the guest terminal 30 includes an input unit 311, a display unit 312, an overall control unit 313, a communication control unit 314, and a short distance communication unit 315. These input unit 311, display unit 312, overall control unit 313, communication control unit 314, and short distance communication unit 315 are configured by a computer program operating on the CPU 301. Besides, the input unit 311, display unit 312, overall control unit 313, communication control unit 314, and short distance communication unit 315 may be formed of hardware circuits that operate in cooperation with one another.

Further, the input unit 311, display unit 312, communication control unit 314, and short distance communication unit 315 may be realized on a browser installed on the guest terminal 30. For example, the browser may realize the functions of these input unit 311, display unit 312, communication control unit 314, and short distance communication unit 315, according to a computer program provided from a server accessed by the guest terminal 30 via a network. Further, the overall control unit 313 is a function realized on an operating system (OS), which is a computer program that controls the overall operation of this guest terminal 30.

The input unit 311 receives an input to the input device 306 and performs processing according to a position specified by the input. The display unit 312 generates display control information for causing the display device 304 to perform display. The communication control unit 314 is a third communication unit that controls the communication I/F 308 to perform communication through the wireless LAN. The overall control unit 313 controls the respective functions of the guest terminal 30 as a whole. The short distance communication unit 315 is a fourth communication unit that controls the short distance communication I/F 309 and receives short distance wireless communication. The short distance communication unit 315 transfers received information to the overall control unit 313 and communication control unit 314.

Figure 6:
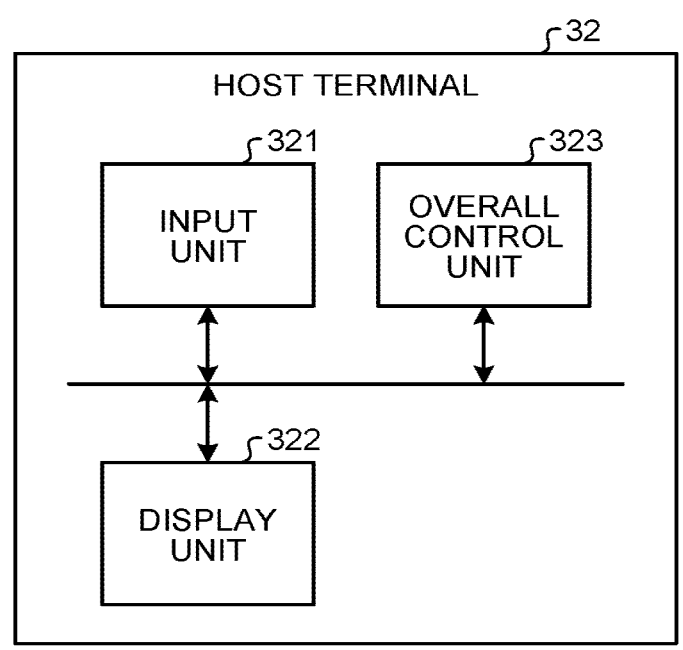
FIG. 6 is a functional block diagram of an example for explanation of functions of a host terminal applicable to the first embodiment.

FIG. 6 is a functional block diagram of an example for explanation of functions of the host terminal 32 applicable to the first embodiment. In FIG. 6, the host terminal 32 includes an input unit 321, a display unit 322, and an overall control unit 323. These input unit 321, display unit 322, and overall control unit 323 are configured by a computer program operating on a CPU that the host terminal 32 includes.

Similarly to the above described guest terminal 30, a browser is installed on the host terminal 32, and functions of the input unit 321 and display unit 322 are realized on the browser. These functions of the input unit 321 and display unit 322 are equivalent to the functions of the input unit 311 and display unit 312 of the guest terminal 30, and thus detailed description thereof will be omitted. Further, functions of the overall control unit 323 are functions realized on an OS installed on the host terminal 32. Functions of this overall control unit 323 are also equivalent to the functions of the above described overall control unit 313 of the guest terminal 30, and thus detailed description thereof will be omitted.

Besides, the input unit 321, display unit 322, and overall control unit 323 may be configured by an application program installed on the host terminal 32, or may be configured of hardware that operates in mutual cooperation.

Authentication Processing According to First Embodiment

Figure 7:
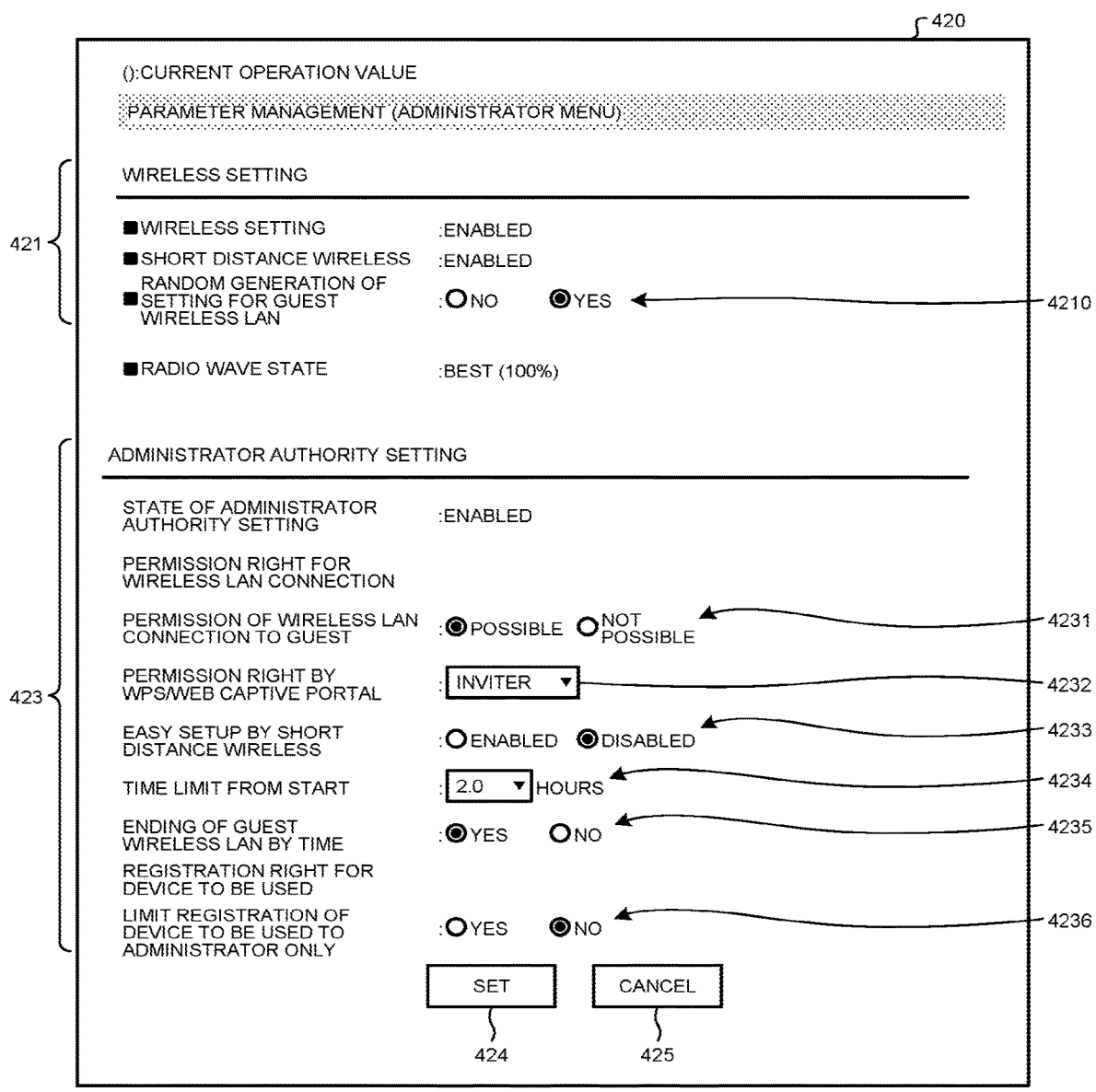
FIG. 7 is a view illustrating an example of a communication management screen for setting a communication environment of the guest terminal, according to the first embodiment.

Next, an example of authentication processing of the guest terminal 30, according to the first embodiment, will be described in more detail. In performing the authentication processing of the guest terminal 30, a communication environment of the guest terminal 30 is set in advance. For example, a system administrator of the network system 1a uses a communication management screen for setting the communication environment of the guest terminal 30 to set the communication environment of the guest terminal 30, from a management terminal connected to the network 10. FIG. 7 illustrates an example of this communication management screen.

In FIG. 7, a communication management screen 420 includes regions 421 and 423, a set button 424, and a cancel button 425. In the region 421, an input section 4210 is included, and setting and display related to wireless communication with respect to the guest terminal 30 are performed therein. In the region 421, the wireless LAN and short distance wireless communication are set to be enabled. These settings are preset separately.

In the region 421, at the input section 4210, whether or not the setting of the wireless LAN for the guest terminal 30 is to be randomly set is specified. When specifying the random setting at the input section 4210, for example, the communication control device 20a is able to randomly generate a file name of a connection setting file used in connecting to the guest AP 41, for every connection of the guest terminal 30. Thereby, security of communication via the guest AP 41 is able to be improved. Besides, a password to be used in connecting to the guest AP 41 may be randomly generated for every connection of the guest terminal 30.

In the region 423, input sections 4231 to 4236 are included, and authority of the administrator is set. At the input section 4231, whether or not the guest terminal 30 is to be permitted to connect to the network 10 through the wireless LAN is set.

At the input section 4232, a target to be given with a right to permit access of the guest terminal 30 using the Wi-Fi Protected Setup (registered trademark, WPS) or a captive portal is specified. For example, when specifying "inviter" at the input section 4232, the host user, who has invited the guest user to the network system 1a, is set as the target to be given with the permission right. In this case, specifically, the permission right is given to the host user, who has logged in the network system 1a from the host terminal 32.

At this input section 4232, the target to be given with the right to permit the access of the guest terminal 30 is able to be selected from plural access levels. For example, a first access level may be an access right level ("inviter" in the example of FIG. 7) for temporarily permitting the guest user to use each of the information devices 11a, 11b, 11c, Further, a second access level higher than the first access level may be an access right level (for example, "manager") where settings of the network 10 and settings of the wireless LAN by the guest AP 41 are changeable. At the input section 4232, from these "inviter" and "manager", the target to be given with the right to permit the access of the guest terminal 30 is selected.

At the input section 4233, whether or not easy setup to the network 10 through short distance wireless communication of the guest terminal 30 is to be permitted is set.

At the input section 4234, an upper limit on a connection time period from start of connection of the guest terminal 30 to the guest AP 41 is set. At the input section 4235, whether or not the connection of the guest terminal 30 to the network 10 is to be ended according to time is set. For example, if "YES" is set at the input section 4235, the network system 1a ends the connection of the guest terminal 30 to the network 10, when a connection time period from a start of connection of the guest terminal 30 to the guest AP 41 reaches the upper limit set at the input section 4234.

At the input section 4236, whether or not registration of a device usable by the guest terminal 30 that has connected to the network 10 is to be limited to the administrator of the network system 1a is set. When setting "NO" at the input section 4236, the registration of a usable device is able to be executed from the host user, who has logged in the network system 1a from the host terminal 32.

The set button 424 sets, for the network system 1a, the respective setting contents set on the communication management screen 420 as described above. For example, the management terminal registers, in the management server 12, the respective setting contents set on the communication management screen 420 in response to an operation on the set button 424. The cancel button 425 cancels the respective settings made on the communication management screen 420 and closes this communication management screen 420.

Figure 8:
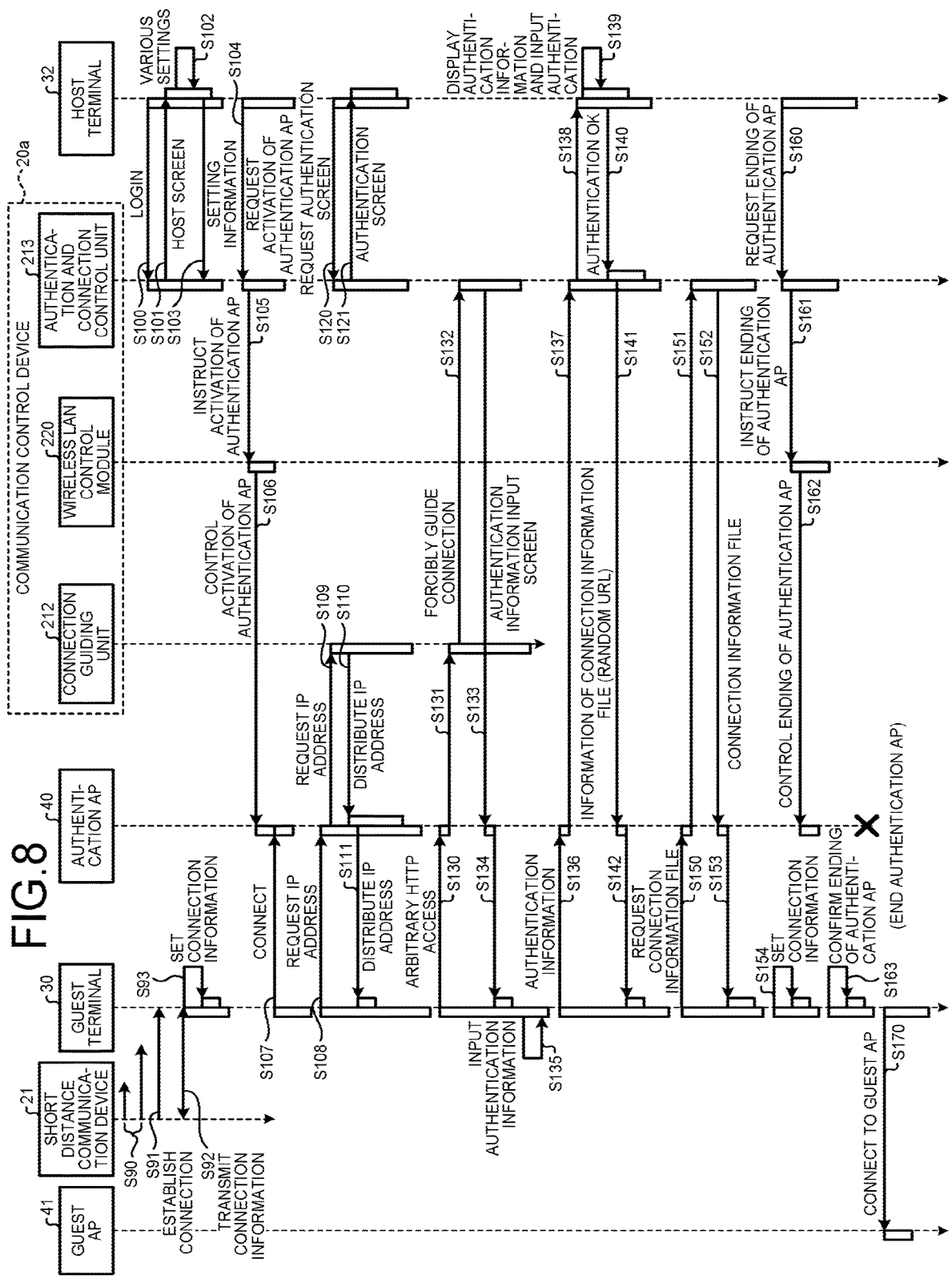
FIG. 8 is a sequence diagram of an example illustrating a process of connecting the guest terminal to a network, according to the first embodiment.

Next, an example of a process of connecting the guest terminal 30 to the network 10, according to the first embodiment, will be described in more detail by use of a sequence diagram of FIG. 8. In FIG. 8, the same elements as in FIG. 1 and FIG. 3 will be denoted by the same symbols and detailed description thereof will be omitted. In FIG. 8, a wireless LAN control module 220 is a function included in the communication control device 20a, and controls operation of the authentication AP 40 and guest AP 41. The wireless LAN control module 220 is realized by a computer program operating on the CPU 201 of the communication control device 20a.

Before the processing according to the sequence diagram of FIG. 8 is started, authentication information for the host user to authenticate the guest user is transferred from the host user to the guest user in some way. In the first embodiment, the host user directly notifies the guest user of the authentication information. A method of notifying of the authentication information is not particularly limited, and the notification may be performed verbally or in writing. Notification of the authentication information may be performed using electronic mail. Notification of the authentication information is preferably performed every time the guest terminal 30 connects to the network 10.

Further, the host terminal 32 is communicatably connected to the network 10 in advance.

In FIG. 8, at Step S90, the short distance communication device 21 broadcasts a signal for establishing connection to a communication destination (Step S90). When the guest terminal 30 enters in a communication range of the short distance communication device 21, the signal transmitted from the short distance communication device 21 is received by the guest terminal 30. Based on the received signal, the guest terminal 30 executes connection establishment processing with the short distance communication device 21 through the short distance communication unit 315. By this connection establishment processing, communication between the short distance communication device 21 and guest terminal 30 is enabled (Step S91).

When communication between the short distance communication device 21 and the guest terminal 30 is enabled, connection information prestored in the ROM that the short distance communication device 21 includes is transmitted to the guest terminal 30 (Step S92). The guest terminal 30 receives the connection information transmitted from the short distance communication device 21 through the short distance communication unit 315. The short distance communication unit 315 transfers the received connection information to the communication control unit 314. The communication control unit 314 executes communication setting of the wireless LAN according to the connection information transferred from the short distance communication unit 315 (Step S93). The connection information includes, for example, an SSID of the authentication AP 40.

Figure 9:
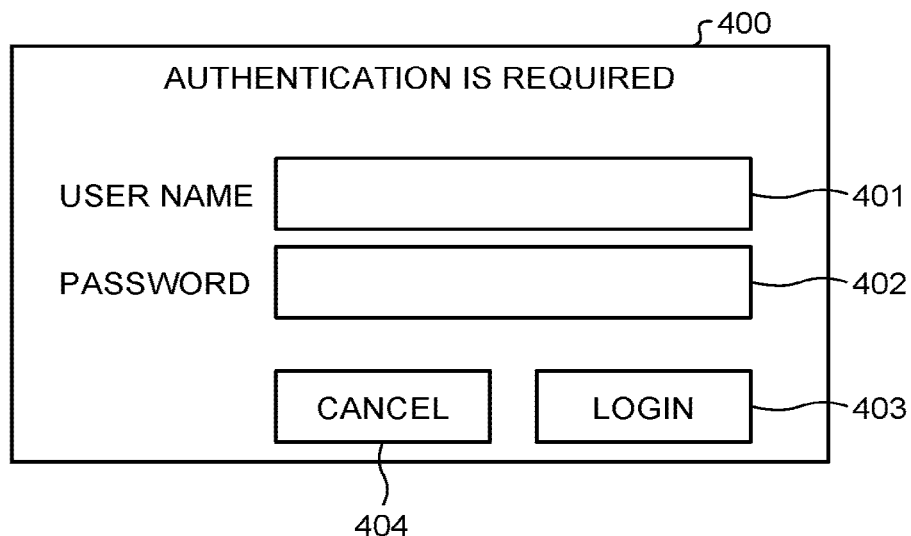
FIG. 9 is a view illustrating an example of a login screen applicable to the first embodiment.

At Step S100, the host terminal 32 logs in the communication control device 20a according to operation of the host user. For example, the host terminal 32 accesses the communication control device 20a according to operation of the host user. The communication control device 20a transmits, to the host terminal 32, a login screen for logging in the communication control device 20a. FIG. 9 illustrates an example of the login screen applicable to the first embodiment. In FIG. 9, a login screen 400 includes input sections 401 and 402, which are respectively for inputting a user name and a password, a login button 403 for requesting login to the communication control device 20a, and a cancel button 404 for canceling a login process.

The host terminal 32 causes the display unit 322 to display the login screen 400 transmitted from the communication control device 20a, on the display device. The host user inputs a user name and a password according to the login screen 400 displayed on the host terminal 32 and operates the login button 403. The host terminal 32 transmits the input user name and password as authentication information to the communication control device 20a, in response to this operation on the login button 403. The communication control device 20a executes authentication processing with respect to the authentication information transmitted from the host terminal 32.

For example, the communication control device 20a transfers, to the management server 12, the authentication information transmitted from the host terminal 32. The management server 12 determines whether or not authentication information matching the authentication information transferred from the communication control device 20a has been registered, and if the authentication information is determined to be registered therein, the management server 12 notifies the communication control device 20a of success in authentication.

At this time, the management server 12 may check, based on the authentication information transferred from the communication control device 20a, whether or not authority of the user related to the authentication information corresponds to the access level selected at the input section 4232 in FIG. 7. For example, the management server 12 determines that authentication has succeeded when the management server 12 has confirmed that the authority of the user related to the authentication information corresponds to the access level selected at the input section 4232 in FIG. 7.

The communication control device 20a transmits a host screen to the host terminal 32 at Step S101, when the communication control device 20a receives notification of success in authentication from the management server 12. The host screen includes a device-to-be-used registration screen for registering an information device to be made usable by the guest terminal 30. Together with the host screen, the communication control device 20a transmits, to the host terminal 32, information to be used in various settings and registration on the host screen.

For example, the communication control device 20a transmits various pieces of information for setting a communication environment on the communication management screen, the various pieces of information prestored in the storage 204 or the like, to the host terminal 32, together with the host screen. Further, the communication control device 20a obtains, from the management server 12, a list of information devices for selecting an information device on the device-to-be-used registration screen, and transmits the obtained list of information devices, together with the host screen, to the host terminal 32.

The host terminal 32 causes the display unit 322 to display the host screen transmitted from the communication control device 20a in Step S101, on the display device. The host terminal 32 transmits the setting information and registration information input in Step S102 according to this host screen to the communication control device 20a (Step S103).

Figure 10:
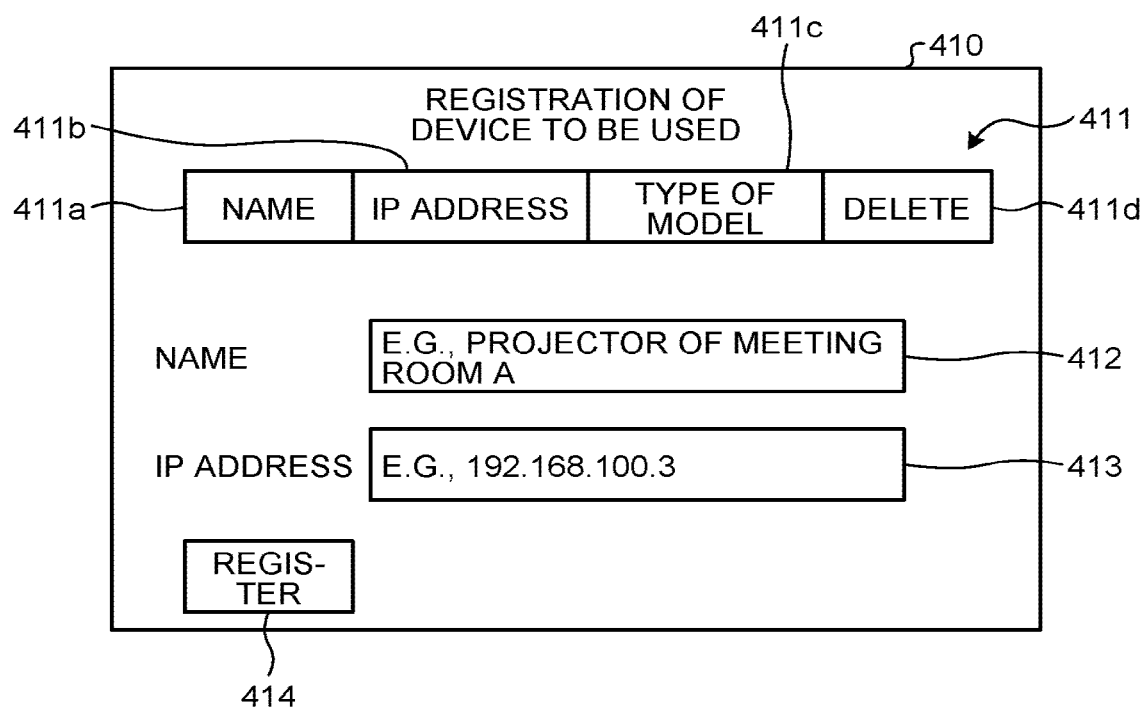
FIG. 10 is a view illustrating an example of a device-to-be-used registration screen for registering a device usable from the guest terminal, according to the first embodiment.

FIG. 10 illustrates an example of a device-to-be-used registration screen 410 for registering a device usable from the guest terminal 30, the device-to-be-used registration screen 410 included in the host screen according to the first embodiment. For example, if "NO" is specified at the above described input section 4236 of the communication management screen 420 in FIG. 7, this device-to-be-used registration screen 410 is displayed on the host terminal 32. The device-to-be-used registration screen 410 includes: a button group 411, which includes selection buttons 411a to 411c and a delete button 411d; input sections 412 and 413; and a register button 414.

The selection buttons 411a to 411c are buttons for selecting a usable device, from, for example, names, IP addresses, and device types, of information devices, respectively. For example, the selection buttons 411a and 411b are for selecting a name and an IP address of an information device, respectively, and thus are for selecting the information devices one by one. In contrast, the selection button 411c is for selecting a type of information devices, and thus plural information devices matching the type are able to be selected at once.

For example, by operation on the selection button 411a, the host terminal 32 causes a list of names of the respective information devices included in the information device list to be displayed in a drop-down list or the like. The host user operates the host terminal 32 to select a name of an information device desired to be made usable, based on this display of the list. The name of the information device selected is brought into a selected state. Plural names of information devices may be selected.

When the register button 414 is operated, the host terminal 32 transmits, to the communication control device 20a, selected device information indicating the information device brought into the selected state on the device-to-be-used registration screen 410. The authentication and connection control unit 213 in the communication control device 20a sets transfer control information for the guest AP 41, according to the selected device information transmitted from the host terminal 32.

The device information of the information devices has been described above to be displayed in a list, but limitation to this example is not made. For example, on the device-to-be-used registration screen 410, icon images indicating the information devices may be displayed to specify these icon images to select information devices desired to be made usable.

Figure 11:
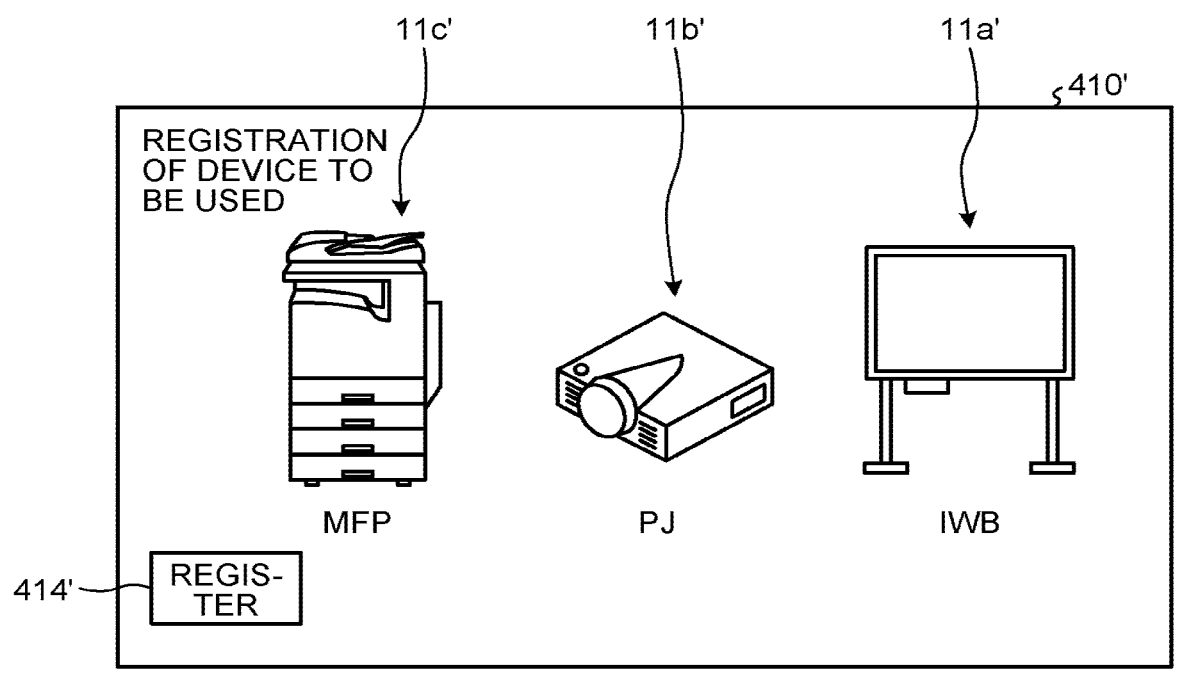
FIG. 11 is a view illustrating an example of a device-to-be-used registration screen using icon images, according to the first embodiment.

FIG. 11 illustrates an example of a device-to-be-used registration screen 410' using icon images, according to the first embodiment. In the example of FIG. 11, the information devices 11a, 11b, and 11c, which are permittable to be used, are displayed as icon images 11a', 11b', and 11c' in the device-to-be-used registration screen 410'.

When a register button 414' is operated after a desired icon image has been selected from the icon images 11a', 11b', and 11c', the host terminal 32 transmits device information of the information device corresponding to the selected icon image to the communication control device 20a. Further, on the device-to-be-used registration screen 410', plural icon images may be selected from the icon images 11a', 11b', and 11c', and device information of plural information devices may be transmitted to the communication control device 20a.

Subsequently, the host terminal 32 transmits, in response to operation on the host terminal 32, an activation request for the authentication AP 40, to the communication control device 20a (Step S104). In response to this activation request, the communication control device 20a instructs activation of the authentication AP 40 to the wireless LAN control module 220 (Step S105). In response to this activation instruction, the wireless LAN control module 220 causes the authentication AP 40 to activate (Step S106).

After transmitting the activation request for the authentication AP 40, the host terminal 32 requests the authentication and connection control unit 213 for an authentication screen for executing authentication of the guest terminal 30 (Step S120). In response to this request, the authentication screen is transmitted from the authentication and connection control unit 213 to the host terminal 32 (Step S121). The host terminal 32 receives this authentication screen and causes the display unit 322 to display the authentication screen on the display device. A specific example of the authentication screen will be described later.

After the authentication AP 40 is activated, connection of the guest terminal 30, the connection using wireless communication by Wi-Fi (registered trademark), to the authentication AP 40, is executed (Step S107). The SSID of the authentication AP 40 is obtained by the guest terminal 30 through short distance wireless communication between the short distance communication device 21 and guest terminal 30 by the above described processing of Step S90 to Step S93. In the guest terminal 30, the communication control unit 314 executes communication control of transmitting the connection information received by the short distance communication unit 315 in Step S92, to the authentication AP 40. The authentication AP 40 may not perform encryption using a Wired Equivalent Privacy (WEP) key or the like.

As described above, in the first embodiment, the guest terminal 30 obtains the SSID of the authentication AP 40 through short distance wireless communication in advance. Thus, the guest user is able to establish connection between the guest terminal 30 and authentication AP 40 without performing the operation of manually inputting the SSID, selecting the authentication AP 40 from plural access points, or the like.

When the connection between the guest terminal 30 and authentication AP 40 is established, the guest terminal 30 transmits an IP address request to request an IP address of the guest terminal 30 in the network 10. This IP address request is received by the connection guiding unit 212 of the communication control device 20*a* via the authentication AP 40 (Step S108 and Step S109). The connection guiding unit 212 generates an IP address in response to this IP address request, and distributes the generated IP address to the guest terminal 30 (Step S110 and Step S111). The guest terminal 30 stores the IP address distributed by the communication control device 20*a* as an IP address of the guest terminal 30 itself.

Subsequently, it is supposed that in response to, for example, an operation of the guest user, access by Hypertext Transfer Protocol (HTTP) to an arbitrary URL from the guest terminal 30 is to be executed (Step S130). An access request with respect to the arbitrary URL, the access request transmitted from the guest terminal 30, is received by the communication control device 20*a*, and obtained by the connection guiding unit 212 (Step S131). The connection guiding unit 212 transfers the obtained access request to the authentication and connection control unit 213 and forcibly guides the access from the guest terminal 30 to the authentication and connection control unit 213 (Step S132).

The authentication and connection control unit 213 transmits, in response to the access request guided and transferred from the connection guiding unit 212, an authentication information input screen to the guest terminal 30. The authentication information input screen transmitted from the authentication and connection control unit 213 is received by the guest terminal 30 via the authentication AP 40 (Step S133 and Step S134).

The guest terminal 30 causes the display unit 312 to display the authentication information input screen transmitted from the authentication and connection control unit 213 on the display device 304. The guest user operates the guest terminal 30 to input authentication information on this authentication information input screen (Step S135). The authentication information input by the guest user is the above described authentication information notified by the host user before the processing according to the sequence diagram in FIG. 8.

Figure 12:
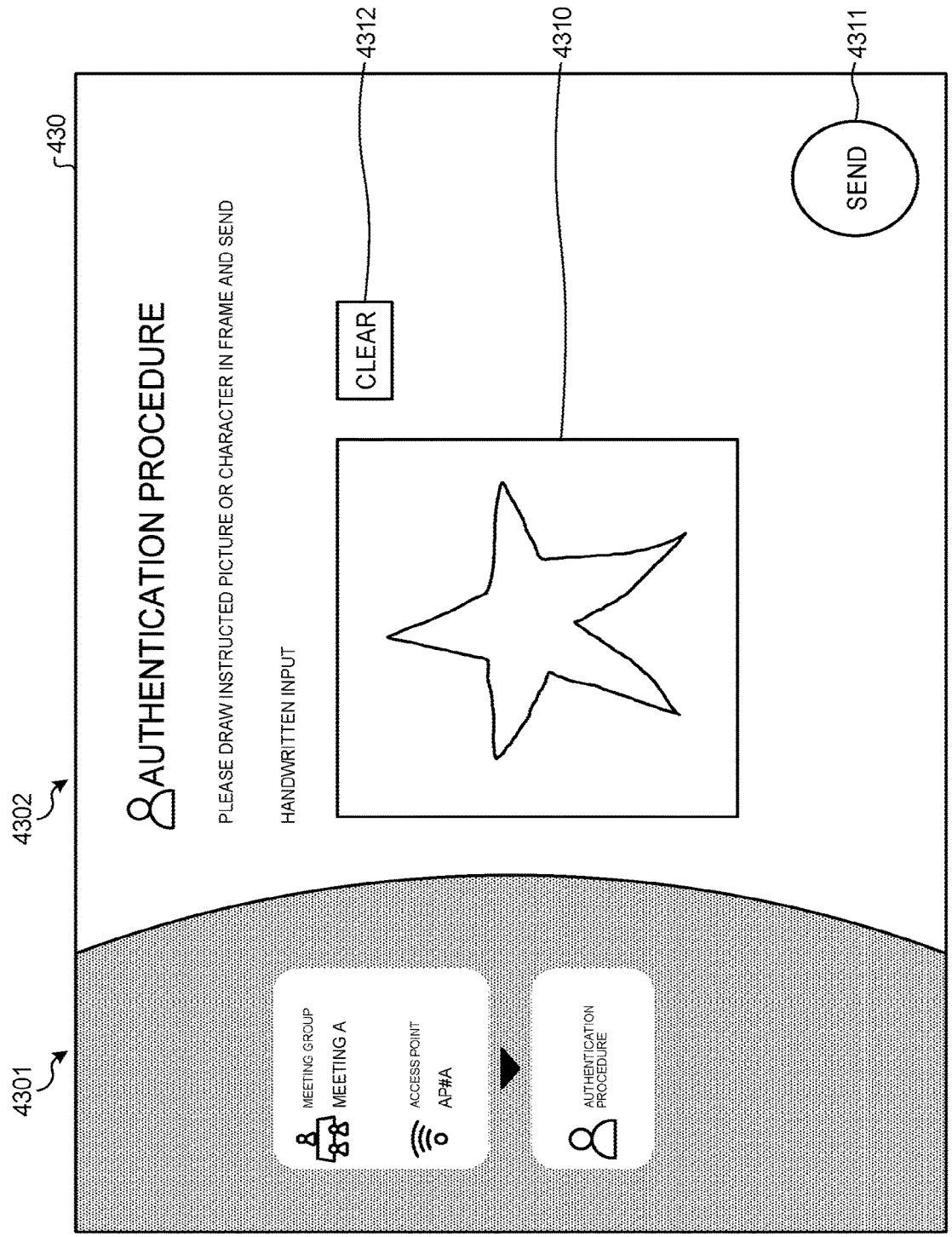
FIG. 12 is a view illustrating an example of an authentication information input screen displayed on the guest terminal, according to the first embodiment.

FIG. 12 illustrates an example of the authentication information input screen displayed on the display device 304 of the guest terminal 30, according to the first embodiment. In FIG. 12, an authentication information input screen 430 includes an information display region 4301 and an input region 4302. In the information display region 4301, for example, a current status of the guest terminal 30 in the current network system 1*a* and information indicating current processing related to this authentication information input screen 430 are displayed.

The input region 4302 includes, for example, a drawing region 4310 for performing drawing in response to operation on the input device 306 of the guest terminal 30, a send button 4311, and a clear button 4312. The guest user performs drawing based on the authentication information notified in advance from the host user, in the drawing region 4310. A content of the drawing is not particularly limited as long as the content is able to be commonly recognized between the guest user and host user, and may be a picture, a character, or a symbol. When the send button 4311 is operated, for example, the authentication information (authentication image) drawn in the drawing region 4310 is transmitted from the guest terminal 30 (Step S136).

By operating the clear button 4312 on the authentication information input screen 430, the content drawn in the drawing region 4310 is able to be cleared. The drawing region 4310 is not limited to the input method of inputting the authentication information by drawing, and for example, authentication information may be input through a character string.

The authentication information (authentication image) transmitted from the guest terminal 30 is received by the authentication and connection control unit 213 via the authentication AP 40 (Step S137). The authentication and connection control unit 213 transmits the received authentication information to the host terminal 32 (Step S138). The host terminal 32 causes the received authentication information to be displayed on the authentication screen obtained from the authentication and connection control unit 213 in Step S121 (Step S139).

Figure 13:
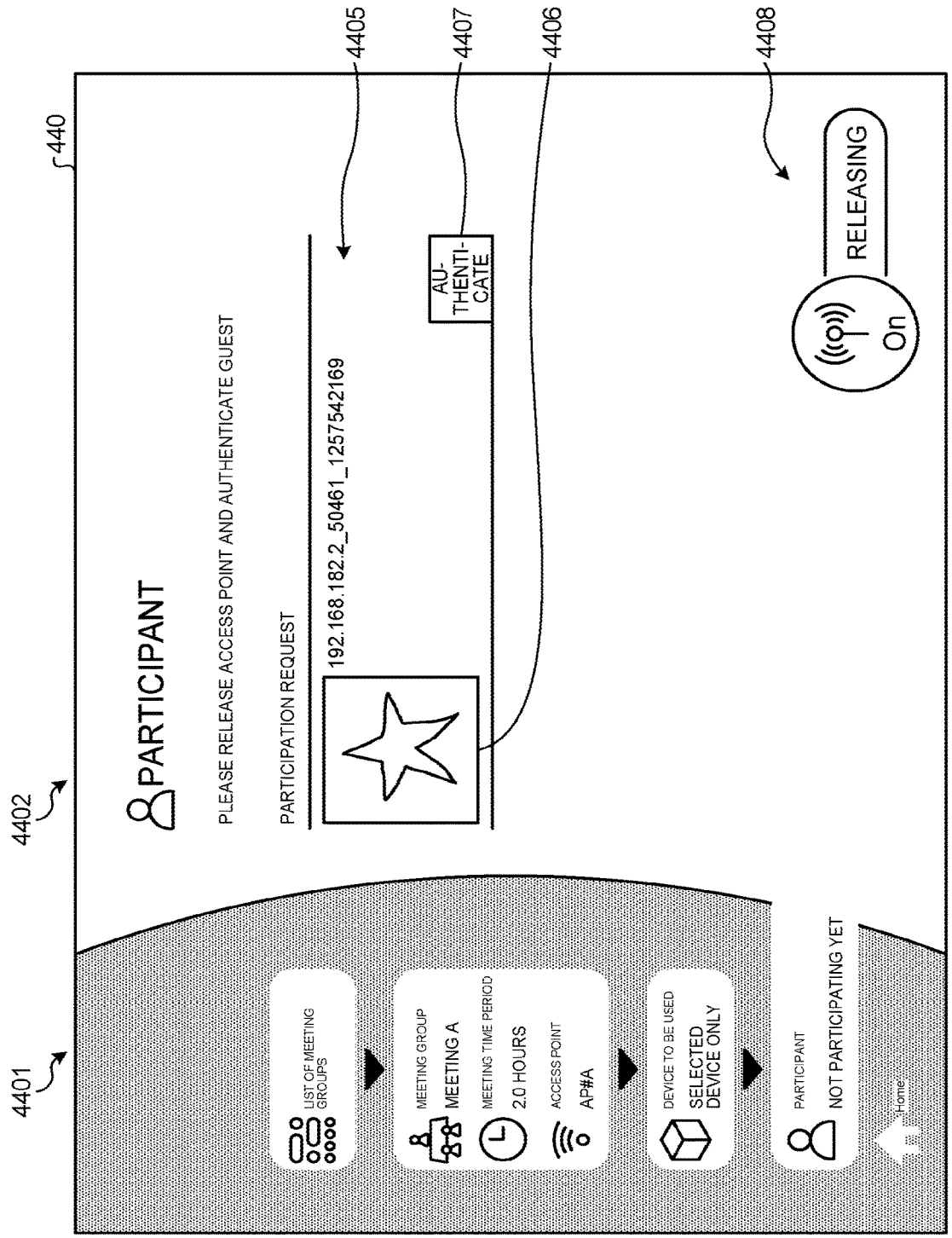
FIG. 13 is a view illustrating an example of an authentication screen displayed on the host terminal, according to the first embodiment.

FIG. 13 illustrates an example of the authentication screen displayed on the host terminal 32, according to the first embodiment. In FIG. 13, the authentication screen 440 includes an information display region 4401 and an authentication region 4402. In the information display region 4401, setting information for access of the guest terminal 30 to the network 10 or the like is displayed.

The authentication region 4402 includes a terminal information display section 4405, an authentication information display section 4406, an authenticate button 4407, and a connection information display section 4408. In the terminal information display section 4405, information (IP address or the like) of the guest terminal 30 to be authenticated is displayed. In the authentication information display section 4406, authentication information (authentication image) transmitted from the guest terminal 30 is displayed. The authenticate button 4407 is a button for authenticating the guest terminal 30 to be authenticated. In the connection information display section 4408, a connection state of the guest terminal 30 is displayed.

For example, when the host user operates the authenticate button 4407 in response to the authentication information (authentication image) displayed in the authentication information display section 4406, the host terminal 32 transmits an authentication OK notification indicating authentication of the guest terminal 30, to the authentication and connection control unit 213 (Step S140). When the authentication and connection control unit 213 receives the authentication OK notification from the host terminal 32, the authentication and connection control unit 213 generates a connection information file including connection information used for connection of the guest terminal 30 to the guest AP 41.

The authentication and connection control unit 213 generates the connection information file including, for example, the SSID of the guest AP 41 and an encryption key (PSK), and randomly generates a file name of this connection information file. The authentication and connection control unit 213 transmits, to the guest terminal 30, via the authentication AP 40, a URL indicating a position of the connection information file on the network 10, the URL including the randomly generated file name (Step S141 and Step S142).

When the guest terminal 30 receives the URL transmitted from the authentication and connection control unit 213, the guest terminal 30 requests, according to the received URL, the authentication and connection control unit 213, via the authentication AP 40, for the connection information file for connecting to the guest AP 41 (Step S150 and Step S151). In response to this request, the authentication and connection control unit 213 transmits the connection information file to the guest terminal 30 via the authentication AP 40 to distribute the connection information file to the guest terminal 30 (Step S152 and Step S153). The guest terminal 30 installs the connection information file transmitted from the authentication and connection control unit 213 on the guest terminal 30 itself to set the connection information (Step S154).

When an end instruction for the authentication AP 40 is further made by the host user's operation on the host terminal 32 after the authenticate button 4407 has been operated in the above described Step S140, the host terminal 32 transmits an end request for the authentication AP 40, to the authentication and connection control unit 213 (Step S160). In response to this end request, the authentication and connection control unit 213 instructs ending of the authentication AP 40 to the wireless LAN control module 220 (Step S161). In response to this end instruction, the wireless LAN control module 220 causes the operation of the authentication AP 40 to end (Step S162).

The guest terminal 30 recognizes that the connection to the authentication AP 40 has been disconnected with the ending of the operation of the authentication AP 40 to confirm the ending of the authentication AP 40 (Step S163). After the confirmation of the ending of the authentication AP 40, the guest terminal 30 connects to the guest AP 41 according to the connection information set in Step S154 (Step S170). Thereby, the guest terminal 30 is enabled to access the network 10.

As described above, in the first embodiment, access to an arbitrary destination from the guest terminal 30 is forcibly guided to the authentication and connection control unit 213, and an input screen for authentication information is transmitted from the authentication and connection control unit 213 to the guest terminal 30. Whether or not the connection between the guest terminal 30 and network 10 is to be permitted is then determined by the host user, based on the prenotified authentication information input by the guest user on the authentication information input screen. Thus, the guest terminal 30 is able to be connected easily to the network 10. Further, malicious invasion of the network 10 from outside the organization is able to be prevented. Furthermore, in the first embodiment, whether or not to permit connection between the guest terminal 30 and network 10 is determined by the host user, and thus control of connectability of the guest terminal 30 is able to be performed without settings of the access point or the like being changed.

First Modification of First Embodiment

Figure 14:
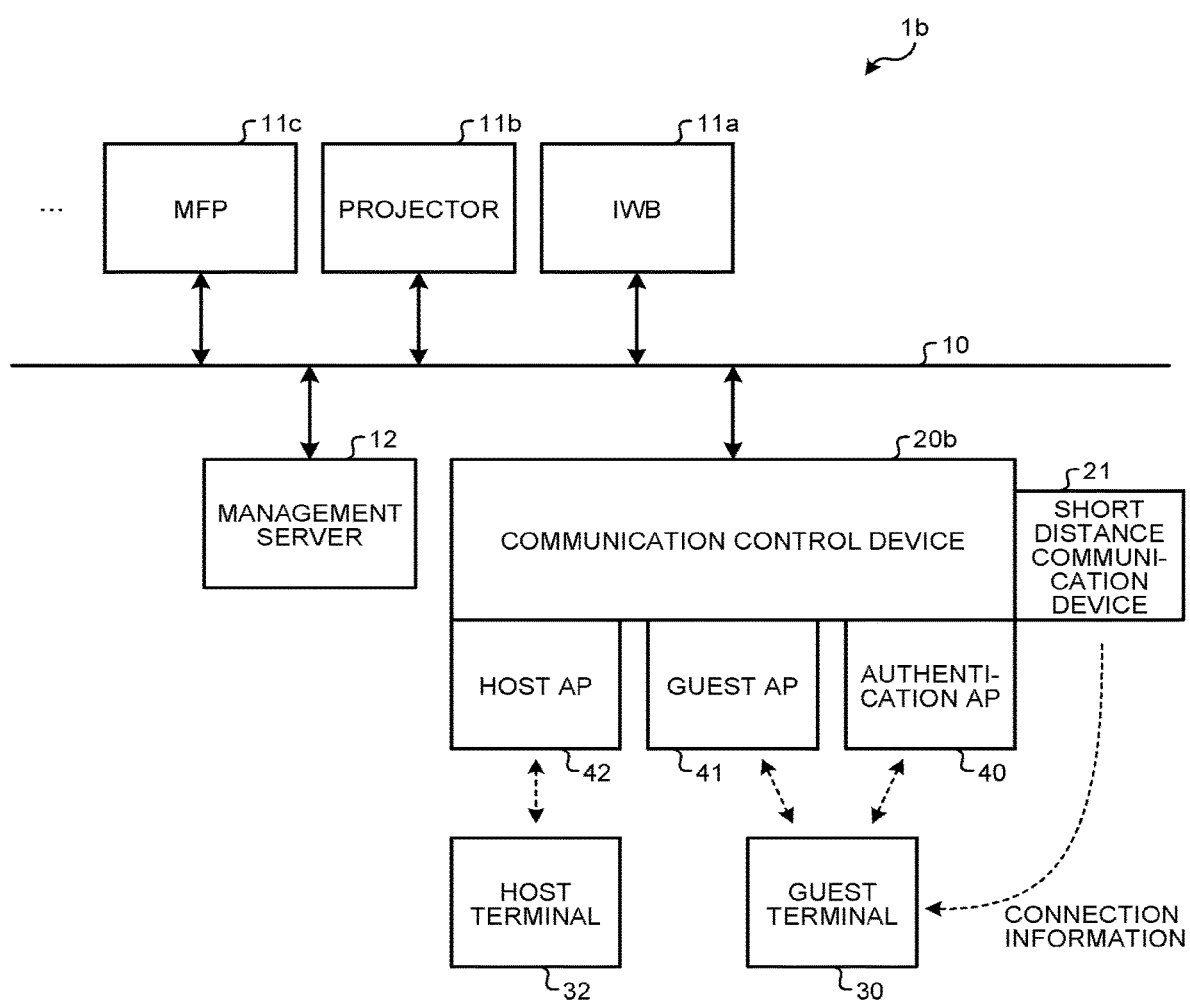
FIG. 14 is a block diagram illustrating a configuration of an example of a network system according to a first modification of the first embodiment.

Next, a first modification of the first embodiment will be described. FIG. 14 illustrates a configuration of an example of a network system according to the first modification of the first embodiment. In FIG. 14, the same elements as in FIG. 1 described above will be denoted by the same symbols and detailed description thereof will be omitted.

In FIG. 14, in a network system 1b according to the first modification of the first embodiment, the host terminal 32 is connected to a communication control device 20b via a host AP 42 through the wireless LAN. The host AP 42 is further connected to the authentication and connection control unit 213 in the communication control device 20b. Further, the host terminal 32 performs communication with the host AP 42 according to an encryption scheme prescribed in WPA2 Personal or the like. A process of connecting the guest terminal 30 to the network 10 is the same as the connection process according to the first embodiment described by use of FIG. 8, and thus description thereof will be omitted.

Second Modification of First Embodiment

Figure 15:
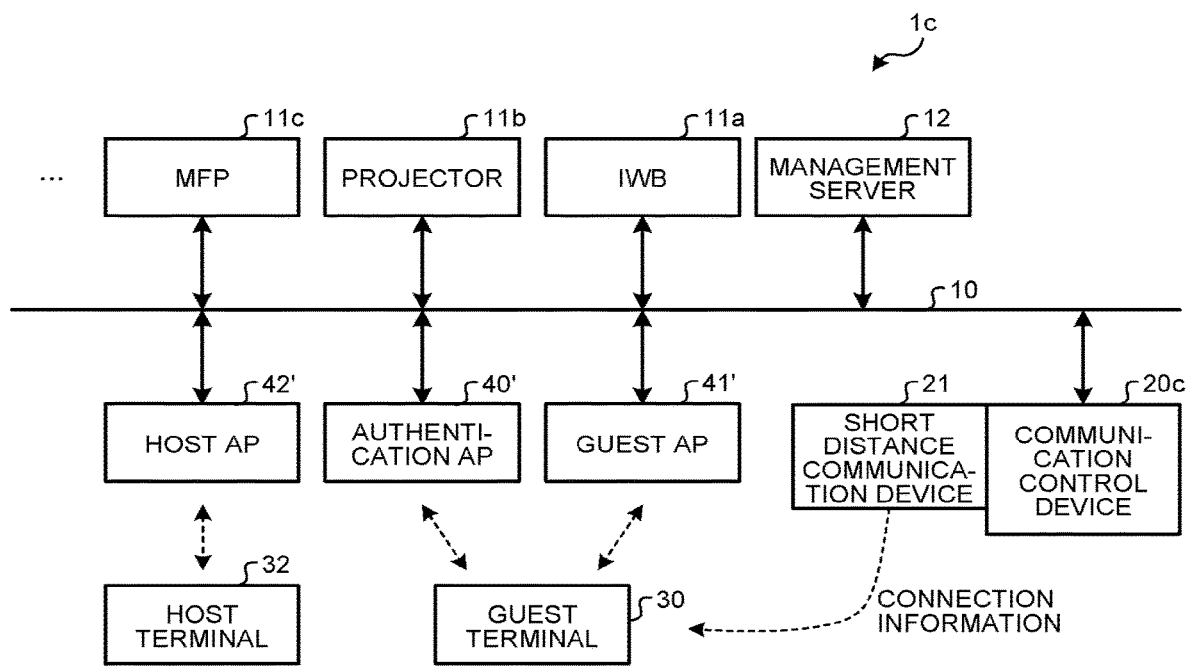
FIG. 15 is a block diagram illustrating a configuration of an example of a network system according to a second modification of the first embodiment.

Next, a second modification of the first embodiment will be described. FIG. 15 illustrates a configuration of an example of a network system according to the second modification of the first embodiment. In FIG. 15, the same elements as in FIG. 1 described above will be denoted by the same symbols and detailed description thereof will be omitted.

In FIG. 15, in a network system 1c according to the second modification of the first embodiment, an authentication AP 40' and a guest AP 41', with which the guest terminal 30 performs communication, and a host AP 42', with which the host terminal 32 performs communication, are connected to the network 10. In this case, similarly to the first modification of the first embodiment described above, the host terminal 32 performs communication with the host AP 42', according to an encryption scheme prescribed in WPA2 Personal, or the like. A communication control device 20c is provided with the short distance communication device 21. Further, the communication control device 20c performs communication with the authentication AP 40', guest AP 41', and host AP 42' via the network 10.

Furthermore, the guest terminal 30 connects to the authentication AP 40' through communication without encryption according to WPA2 Personal to perform authentication processing via the authentication AP 40' similarly to the connection process according to the first embodiment described by use of FIG. 8. After success in authentication, the guest terminal 30 performs communication with the network 10 via the guest AP 41' according to the encryption scheme according to WPA2 Personal.

By these configurations according to the first modification and second modification of the first embodiment, access to an arbitrary destination from the guest terminal 30 is forcibly guided to the authentication and connection control unit 213, the guest terminal 30 is caused to display the input screen for authentication information, and whether or not authentication of the guest terminal 30 is enabled is determined by the host user, based on the prenotified authentication information input by the guest user on the authentication information input screen. Therefore, the guest terminal 30 is able to be connected to the network 10 easily, and malicious invasion of the network 10 from outside the organization is able to be prevented. Further, in each of the modifications of the first embodiment, whether or not connection between the guest terminal 30 and network 10 is to be permitted is determined by the host user, and thus control of connectability of the guest terminal 30 is able to be performed without settings of the access point or the like being changed.

Third Modification of First Embodiment

Next, a third modification of the first embodiment will be described. Each function executed on the communication control device 20 according to the above described first embodiment may be configured based on the concept of software-defined network (SDN). The SDN will be described schematically.

Conventionally, a network environment, such as an intra-organization LAN having a configuration closed in an organization, has been generally constructed by a full-time person in charge, who is familiar with setting and operation of LAN switches provided by respective vendors and wireless LAN access points. Such a network environment is in a state of the so-called "vendor lock-in", where only authentication means and operation methods by solution of the vendors are provided, and it has been difficult for the organization to freely set an authentication means and an operation method.

With respect to this problem, in recent years, in order for an organization, which is a user, to be able to construct the user's own network, the concept called SDN has attracted attention, the SDN enabling control of movement of data on the network by software only. In relation to this SDN, representative construction technique elements attracting attention include "virtualization of network", and "Open-Flow", which is one of methods (protocols) of controlling communication on that virtualized network, and which has an open specification not dependent on the vendors.

Virtualization of network is a collection of techniques including plural components, including, for example, a virtual interface technique that makes a single physical interface appear as plural physical interfaces (or make plural physical interfaces appear as one), a virtual switch technique of connecting and relaying virtual interfaces, and the like. Network virtualization virtually separates a logical network configuration from a physical network configuration by a combination of physical network devices, virtual network parts, and protocol techniques, and realizes a flexible network configuration not bound by physical configuration.

In OpenFlow, communication is regarded as an end-to-end flow, and routing control, load distribution, optimization, and the like are able to be executed in units of those flows. Specifically, OpenFlow is realized by change to a centralized control type, without analysis and transfer of each data packet in a distributed autonomous manner in a relay device or the like of a data communication path.

In OpenFlow, a "control plane", where data analysis, transfer destination determination, and determination control are performed, is separated from a "data plane", which is a part where mere physical transmission of packets is performed. In OpenFlow, an OpenFlow controller (OFC) controlling the control plane instructs a transfer rule, and an OpenFlow switch (OFS) playing a part in the data plane performs transfer of packets according to instructions of the OFC. More specifically, the OFS performs transfer of packets according to a flow table that the OFS includes, the flow table on which the OFC performs addition and rewriting. By use of this construction, OpenFlow is able to be utilized as a tool or the like for controlling the above described virtualization of network.

Figure 16:
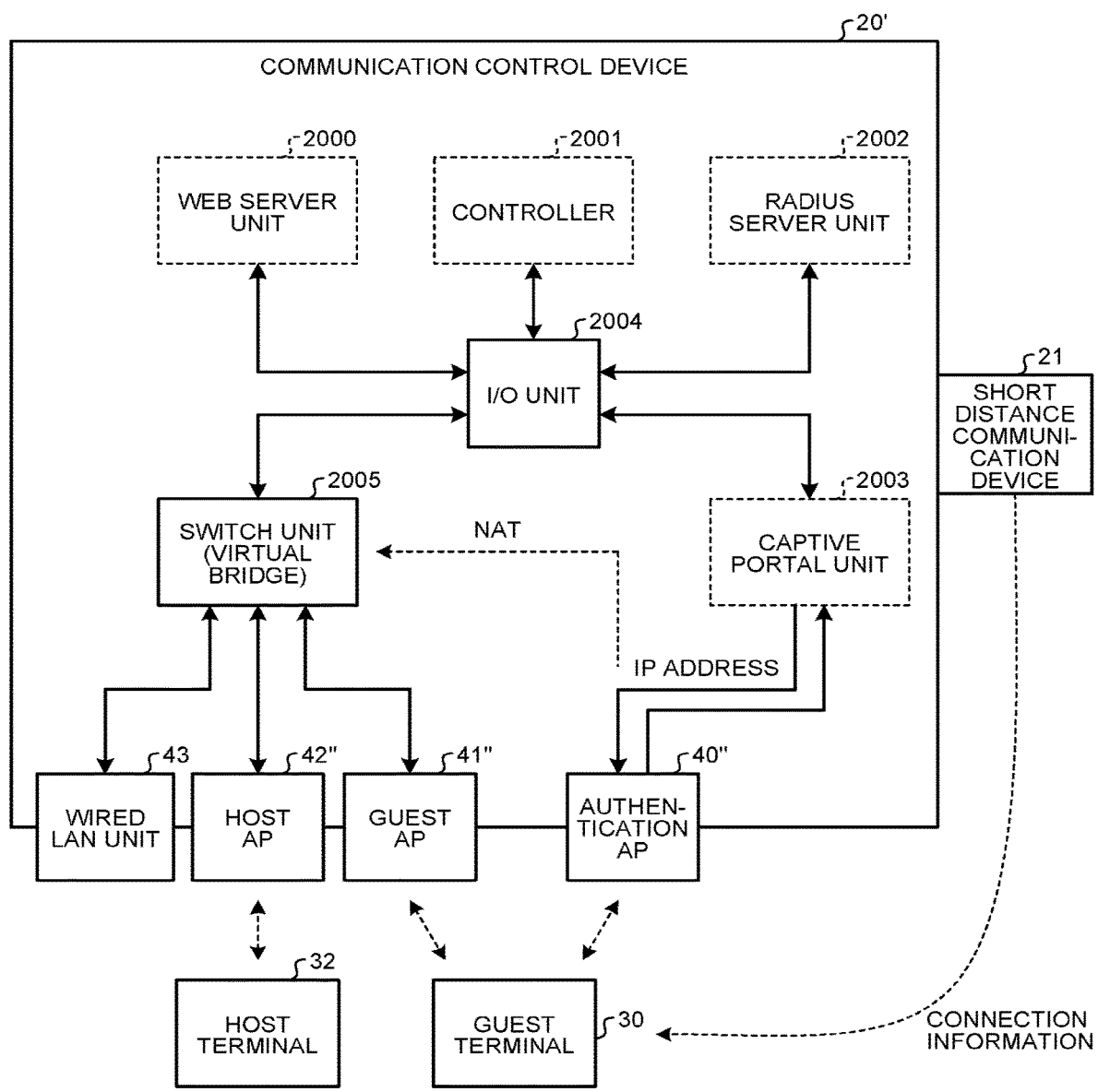
FIG. 16 is a functional block diagram of an example illustrating functions of a communication control device according to a third modification of the first embodiment.

FIG. 16 is a functional block diagram of an example illustrating functions of a communication control device according to the third modification of the first embodiment. In FIG. 16, a communication control device 20' is an example of a case where, for example, the communication control device 20a according to the first embodiment is configured by application of the concept of SDN. The network system 1b according to the first modification of the first embodiment described above is applicable to the third modification of the first embodiment. Besides, the network system 1a according to the first embodiment described above may be applied to the third modification of the first embodiment.

In FIG. 16, the communication control device 20' includes a Web server unit 2000, a controller 2001, a RADIUS server unit 2002, a captive portal unit 2003, an I/O unit 2004, and a switch unit 2005. These Web server unit 2000, controller 2001, RADIUS server unit 2002, captive portal unit 2003, I/O unit 2004, and switch unit 2005 are configured by a computer program operating on the CPU 201.

Further, in FIG. 16, an authentication AP 40", a guest AP 41", and a host AP 42" are access points each compatible with Wi-Fi (registered trademark). These authentication AP 40", guest AP 41", and host AP 42" may be each configured by independent hardware or virtually configured by a computer program. In the latter case, for example, in the communication control device 20', the CPU 201 switches over, for a single wireless LAN access point, among SSIDs of the authentication AP 40", guest AP 41", and host AP 42" according to the computer program. A wired LAN unit 43 controls communication between the communication control device 20' and the network 10.

Further, in the third modification of the first embodiment, similarly to the above described first embodiment, the short distance communication device 21 that performs short distance wireless communication is provided for the communication control device 20'. In this case also, the short distance communication device 21 is independent from each function of the communication control device 20'. Furthermore, as described above, Bluetooth (registered trademark) of Class 3, for example, is preferably applied to the short distance communication device 21.

In FIG. 16, the authentication AP 40" and guest AP 41" respectively correspond to the authentication AP 40 and guest AP 41 according to the first embodiment. That is, the authentication AP 40" performs communication with the guest terminal 30 without encryption by WPA2 Personal or the like, and the guest AP 41" performs communication with the guest terminal 30 according to the encryption scheme prescribed by WPA2 Personal, for example. Further, in FIG. 16, the host AP 42" corresponds to the host AP 42 of the first modification of the first embodiment, and performs communication with the host terminal 32 according to the encryption scheme prescribed by WPA2 Personal.

Furthermore, the short distance communication device 21 prestores connection information for connection of the guest terminal 30 to the authentication AP 40", into the ROM that the short distance communication device 21 includes, and broadcasts the connection information stored in the ROM through short distance wireless communication.

In FIG. 16, the Web server unit 2000 is able to provide a Web page to each of the guest terminal 30 and host terminal 32 by performing communication according to HTTP with the guest terminal 30 and host terminal 32 via the guest AP 41" and host AP 42", respectively, for example. The RADIUS server unit 2002 performs authentication processing of the host terminal 32 and guest terminal 30, for example.

In FIG. 16, the captive portal unit 2003 corresponds, for example, to the connection guiding unit 212 in the first embodiment, and has a function of forcibly guiding a received packet to a specific destination and the DHCP functions. The Web server unit 2000, controller 2001, and RADIUS server unit 2002 are each included in the authentication and connection control unit 213 in the first embodiment. The above described functions of the OFC are realized by the controller 2001, for example. The I/O unit 2004 controls a path of input data according to, for example, information indicating a destination added to the data.

To the switch unit 2005, the guest AP 41", the host AP 42", and the wired LAN unit 43 are connected. The switch unit 2005 corresponds to the above described OFS, and includes a flow table, and functions of a virtual bridge. The virtual bridge virtually realizes, by a computer program, a bridge that relays a packet between the network 10 connected by the wired LAN unit 43 and wireless LAN communication by the guest AP 41" and host AP 42". The switch unit 2005 controls behavior of the relayed packet, according to transfer control information including conditions of a packet to be processed and information indicating a transfer destination of the packet, the transfer control information written in the flow table by the controller 2001, for example.

Next, an example of a process of connecting the guest terminal 30 to the network 10, according to the third modification of the first embodiment, will be described with reference to the above described sequence diagram of FIG. 8. In the third modification of the first embodiment also, according to the processing of Step S90 to Step S93 in FIG. 8, connection establishment processing is performed between the short distance communication device 21 and the short distance communication unit 315 of the guest terminal 30, and when the connection has been established, connection information is transmitted from the short distance communication device 21 to the short distance communication unit 315. The short distance communication unit 315 sets the received connection information to the communication control unit 314. Thereby, when the authentication AP 40" is activated, communication between the guest terminal 30 and authentication AP 40" is enabled.

When the authentication by the RADIUS server unit 2002 succeeds (Step S100 to Step S103 in FIG. 8), the host terminal 32 requests the controller 2001 to activate the authentication AP 40" (Step S104 in FIG. 8). The controller 2001 activates, in response to this request, the authentication AP 40" (Step S105 and Step S106 in FIG. 8).

Further, the host terminal 32 requests the communication control device 20' for an authentication screen (Step S120 in FIG. 8). This request for an authentication screen is input to the switch unit 2005 via the host AP 42". The switch unit 2005 has, in the flow table, transfer control information written by the controller 2001, the transfer control information enabling packet transfer via the guest AP 41" between the host terminal 32 and Web server 2000. The switch unit 2005 transfers the request for an authentication screen input from the host AP 42" to the Web server unit 2000, according to this transfer control information (Step S121 in FIG. 8).

The guest terminal 30 connects to the activated authentication AP 40" using the connection information set in Step S93 (Step S107 in FIG. 8), and requests the communication control device 20' for an IP address (Step S108 and Step S109 in FIG. 8). The IP address request is received by the captive portal unit 2003.

The captive portal unit 2003 issues the IP address according to the received IP address request and transmits the IP address to the guest terminal 30 via the authentication AP 40" to distribute the IP address to the guest terminal 30 (Step S110 and Step S111 in FIG. 8).

If access from the guest terminal 30 to the communication control device 20' by HTTP with an arbitrary URL is executed at this time point, the access request is transferred to the captive portal unit 2003 from the authentication AP 40" (Step S130 and Step S131 in FIG. 8). The captive portal unit 2003 transfers the transferred access request to the Web server unit 2000 via the I/O unit 2004 (Step S132 in FIG. 8). The Web server unit 2000 transmits, in response to the transferred access request, an authentication information input screen like the one described by use of FIG. 12, for example, to the guest terminal 30 (Step S133 and Step S134 in FIG. 8).

The guest terminal 30 transmits authentication information input according to the authentication information input screen, to the communication control device 20' (Step S136 in FIG. 8). The authentication information is received by the authentication AP 40", and transferred from the authentication AP 40" to the Web server unit 2000 via the captive portal unit 2003 (Step S137 in FIG. 8). The Web server unit 2000 inputs the transferred authentication information to the switch unit 2005. The switch unit 2005 transmits, according to the transfer control information written in the flow table, the input authentication information, to the host terminal 32 via the host AP 42" (Step S138 in FIG. 8). The host terminal 32 receives the authentication information, and causes the received authentication information to be displayed on the already obtained authentication screen (Step S139 in FIG. 8).

When authentication is performed by a user operation for the authentication information displayed on the authentication screen on the host terminal 32, authentication OK information is transmitted (Step S140 in FIG. 8). An authentication OK notification is transferred from the host AP 42" to the switch unit 2005, and the authentication OK notification is transferred, according to the transfer control information written in the flow table, by the switch unit 2005, to the Web server unit 2000. In response to the authentication OK notification, the Web server unit 2000 generates a connection information file including, for example, the SSID of the guest AP 41" and an encryption key, and the Web server unit 2000, which randomly generates a file name of this connection information file, transmits a URL including this randomly generated file name and indicating a position of the connection information file on the network 10, to the guest terminal 30 via the authentication AP 40" (Step S141 and Step S142).

The guest terminal 30 requests the communication control device 20', via the authentication AP 40", for the connection information file for connecting to the guest AP 41", according to the URL transmitted from the communication control device 20' (Step S150 in FIG. 8). This request is transferred to the captive portal unit 2003, and transferred from the captive portal unit 2003 to the Web server unit 2000 (Step S152 in FIG. 8). The Web server unit 2000 transmits the connection information file, in response to this request, to the guest terminal 30 via the authentication AP 40" (Step S152 and Step S153 in FIG. 8). Thereby, the connection information file is distributed from the communication control device 20' to the guest terminal 30. The guest terminal 30 installs the connection information file transmitted from the communication control device 20' on the guest terminal 30 itself to set the connection information (Step S154 in FIG. 8).

Further, when an end instruction for the authentication AP 40" is made by an operation on the host terminal 32 by the host user after transmission of the authentication OK notification, the host terminal 32 transmits an end request for the authentication AP 40". This end request is received by the authentication AP 40" via the Web server unit 2000, I/O unit 2004, and captive portal unit 2003, and functions of the authentication AP 40" are stopped (Step S160 to Step S162 in FIG. 8).

When the guest terminal 30 confirms the end of the authentication AP 40" (Step S163 in FIG. 8), the guest terminal 30 connects to the guest AP 41", according to the connection information set in Step S154 (Step S170 in FIG. 8). Further, in the flow table of the switch unit 2005 of the communication control device 20', transfer control information enabling packet transfer between the guest terminal 30 and network 10 via the guest AP 41" and wired LAN unit 43 has been written for the controller 2001. Thereby, the guest terminal 30 is enabled to access the network 10 via the communication control device 20'.

In the third modification of the first embodiment, of the communications performed between the guest terminal 30 and Web server unit 2000 (Step S130 to Step S153 in FIG. 8), at least those communications related to the distribution of the connection information file (for example, Step S141 to Step S153 in FIG. 8) are desirably performed through protected communication. For example, each communication performed between the guest terminal 30 and Web server unit 2000, the communication related to the distribution of the connection information file, is performed using Hypertext Transfer Protocol Secure (HTTPS) as the communication protocol. By performing each communication related to the distribution of the connection information file using HTTPS, the distribution of the connection information file is able to be executed more securely.

According to the third modification of the first embodiment, since OpenFlow is applied to the above described configuration according to the first embodiment, a system is able to be more flexibly and easily configured, the system where a person in the organization (host user) determines, based on prenotified authentication information input by a person outside the organization (guest user), whether or not to permit connection between the guest terminal 30 and network 10.

Second Embodiment

A second embodiment will be described. The second embodiment is an example, in which a communication control device that controls connection of the guest terminal 30 to the network 10 includes a short distance communication device that performs short distance wireless communication as described in the first embodiment.

In the second embodiment, the communication control device transfers connection information for establishing wireless LAN connection, to the guest terminal 30, using short distance wireless communication by the short distance communication device that the communication control device includes. The guest terminal 30 establishes the wireless LAN connection with the communication control device using this connection information, and the communication control device permits the guest terminal 30, for which the wireless LAN connection has been established, to connect to the network 10.

By the guest terminal 30 coming closer into a communicatable range of the short distance wireless communication (for example, within approximately one meter) of the communication control device, the wireless LAN connection between the guest terminal 30 and the communication control device is established. Therefore, the guest user using the guest terminal 30 is able to perform wireless LAN communication with the aimed communication control device without selecting or specifying an access point of the connection destination, and thus thereby connection to the network 10 is enabled.

Further, in order for the guest terminal 30 to establish wireless LAN connection with the communication control device, the guest terminal 30 needs to be immediately near the communication control device. Therefore, the host user provides the guest user the connection to the network 10 in the state where the guest user operating the guest terminal 30 is in front of the host, and an effect equivalent to when the host user executes authentication processing of the guest user is obtained.

Figure 17:
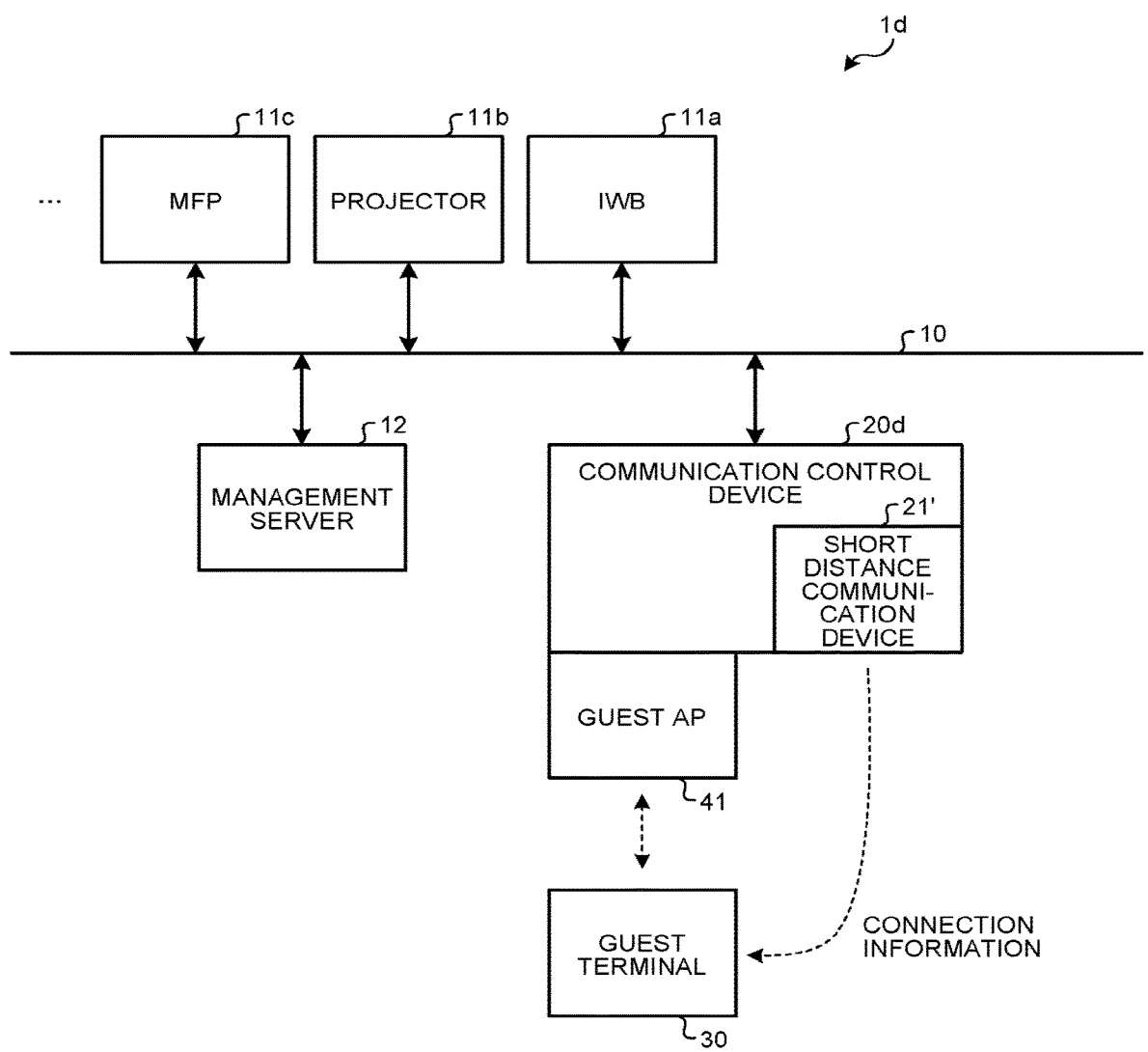
FIG. 17 is a block diagram illustrating a configuration of an example of a network system according to a second embodiment.

FIG. 17 illustrates a configuration of an example of a network system according to the second embodiment. In FIG. 17, the same elements as in FIG. 1 described above will be denoted by the same symbols and detailed description thereof will be omitted.

In a network system 1d illustrated in FIG. 17, a short distance communication device 21' (fifth communication unit), which performs short distance wireless communication, is incorporated in a communication control device 20d. The short distance communication device 21' establishes connection with the guest terminal 30 through short distance wireless communication, and transmits, to the guest terminal 30, for which the connection has been established, connection information used by the guest terminal 30 to connect to the guest AP 41. With the transmission of the connection information by the short distance communication device 21', the communication control device 20d connects the guest AP 41 to the network 10.

The guest terminal 30 establishes connection with the guest AP 41 using the connection information transmitted from the short distance communication device 21' of the communication control device 20d. With the transmission of the connection information by the short distance communication device 21', the guest AP 41 is connected to the network 10. Therefore, the guest terminal 30 is enabled to perform wireless LAN communication with the guest AP 41 and to access the network 10.

As described above, in the network system 1d according to the second embodiment, the guest terminal 30 is enabled to access the network 10 via the guest AP 41 by establishing communication with the communication control device 20d through short distance wireless communication. Therefore, the authentication AP 40 and host terminal 32 used in the network 10 according to the first embodiment are able to be omitted.

Figure 18:
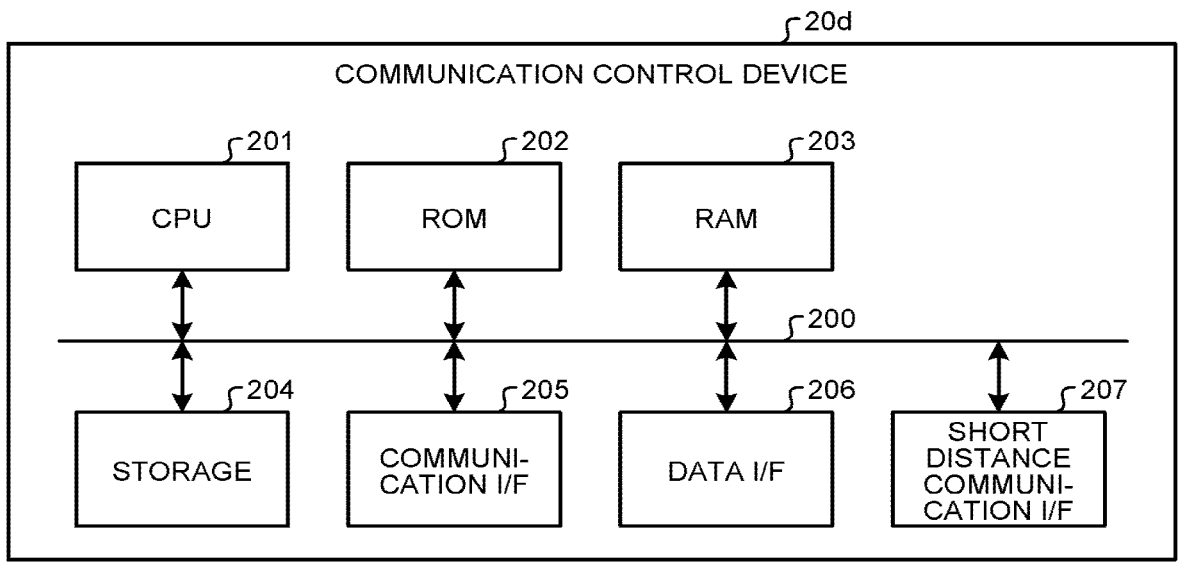
FIG. 18 is a block diagram illustrating a configuration of an example of a communication control device according to the second embodiment.

FIG. 18 illustrates a configuration of an example of the communication control device according to the second embodiment. In FIG. 18, the same elements as in FIG. 2 described above will be denoted by the same symbols and detailed description thereof will be omitted.

As illustrated in FIG. 18, in contrast to the communication control device 20a according to the first embodiment illustrated in FIG. 2, the communication control device 20d according to the second embodiment is added with a short distance communication I/F 207 that controls short distance wireless communication. The short distance communication I/F 207 is connected to the bus 200, and is mutually communicatable with other units forming the communication control device 20d via the bus 200. As a communication method, the above described Class 3 of Bluetooth (registered trademark) is applied to the short distance communication I/F 207.

The communication method applicable to the short distance communication I/F 207 is not limited to Bluetooth (registered trademark), and may be any other communication method, such as NFC or infrared communication, as long as the communication method has directivity and a communication range that are limited compared with the wireless LAN. Further, in FIG. 18, the short distance communication I/F 207 is illustrated as being incorporated in the communication control device 20*d*, but the short distance communication I/F 207 is not limited to this example. For example, the short distance communication I/F 207 may have a configuration of a USB dongle and be used by being fitted to a USB connector that the communication control device 20*d* includes.

Figure 19:
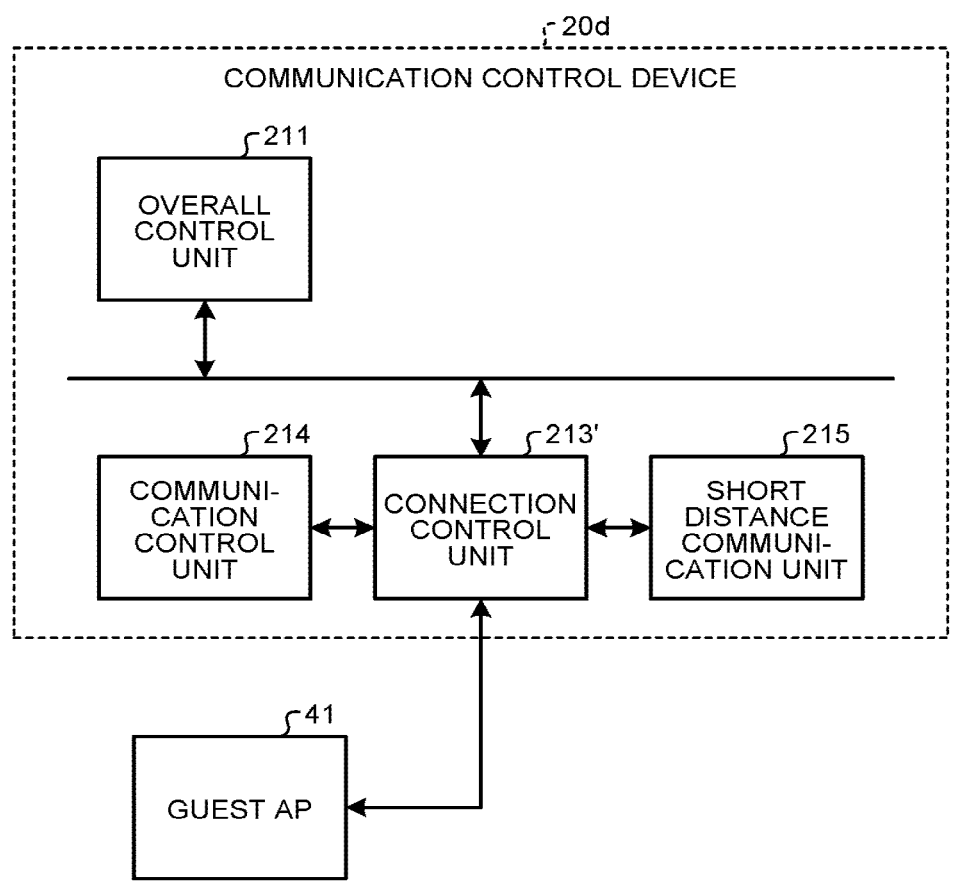
FIG. 19 is a functional block diagram illustrating an example for explanation of functions of the communication control device according to the second embodiment.

FIG. 19 is a functional block diagram of an example for explanation of functions of the communication control device 20*d* according to the second embodiment. In FIG. 19, the same elements as in FIG. 3 described above will be denoted by the same symbols and detailed description thereof will be omitted.

As illustrated in FIG. 19, the communication control device 20*d* according to the second embodiment includes the overall control unit 211, a connection control unit 213', the communication control unit 214, and a short distance communication unit 215. That is, the communication control device 20*d* according to the second embodiment has a configuration, to which the short distance communication unit 215 has been added and from which the connection guiding unit 212 has been omitted, in contrast to the communication control device 20*a* according to the first embodiment illustrated in FIG. 3. Further, in contrast to the authentication and connection control unit 213 according to the first embodiment, the authentication function has been omitted from the connection control unit 213'. These overall control unit 211, connection control unit 213', communication control unit 214, and short distance communication unit 215 are configured by a computer program operating on the CPU 201.

The short distance communication unit 215 controls the short distance communication I/F 207 to perform short distance wireless communication. Further, the short distance communication unit 215 notifies the connection control unit 213' of a result of the communication through the short distance wireless communication. The connection control unit 213' has functions as a connection control unit that performs control of a communication path between the communication control unit 214 and the guest AP 41.

In the second embodiment, since a configuration substantially the same as the configuration described by use of FIG. 4 and FIG. 5 is applicable to the configuration of the guest terminal 30, description thereof will be omitted.

Figure 20:
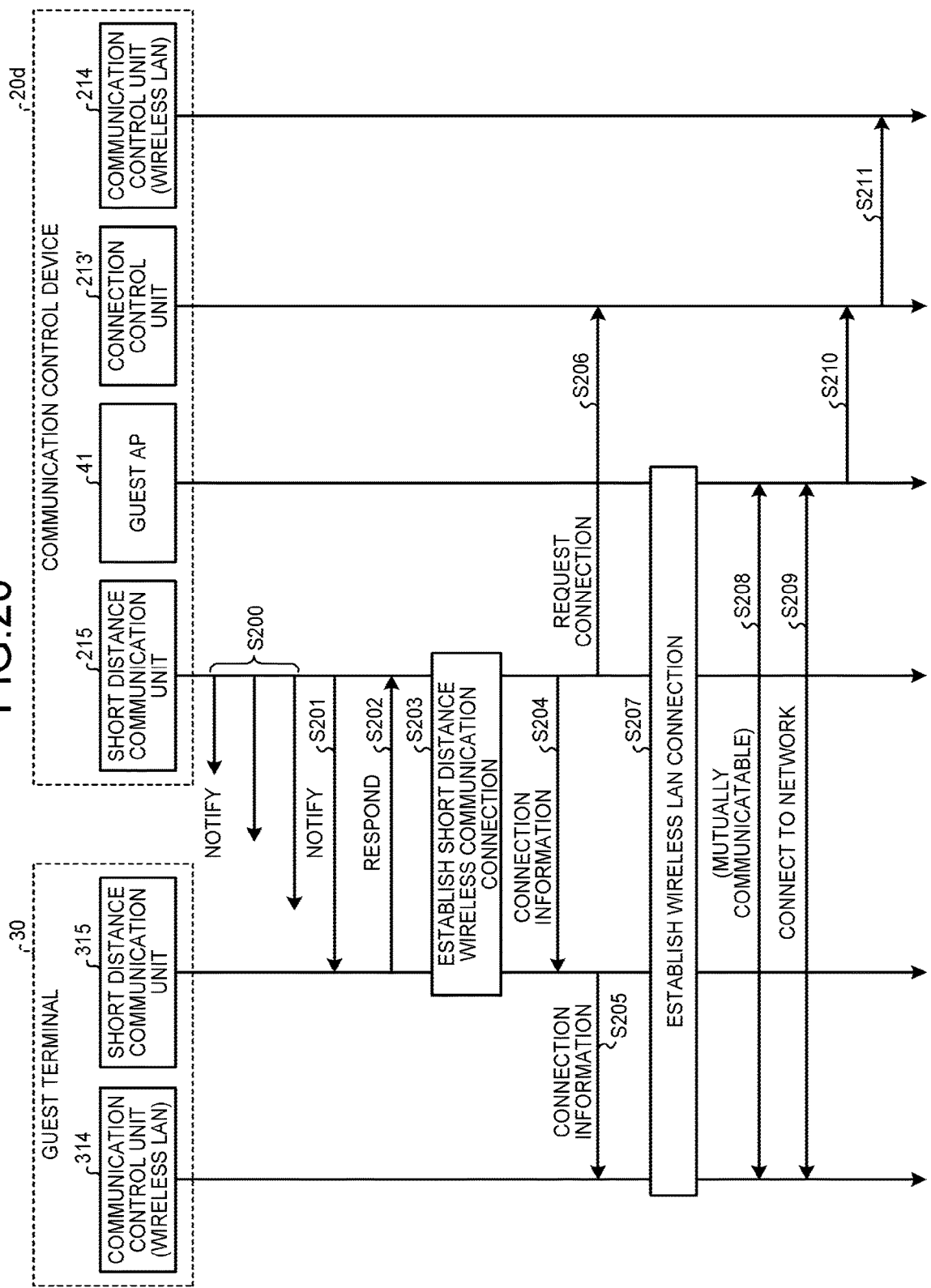
FIG. 20 is a sequence diagram of an example illustrating a process of connecting a guest terminal to a network, according to the second embodiment.

Next, an example of a process of connecting the guest terminal 30 to the network 10, according to the second embodiment, will be described in more detail by use of a sequence diagram of FIG. 20. In FIG. 20, the same elements as in FIG. 5 and FIG. 17 to FIG. 19 described above will be denoted by the same symbols and detailed description thereof will be omitted. Further, in FIG. 20, for the sake of explanation, the guest AP 41 is illustrated as being included in the communication control device 20*d*.

Hereinafter, short distance wireless communication applied to the short distance communication units 215 and 315 will be described as being of Bluetooth (registered trademark) Low Energy with reduced electric power consumption.

At Step S200 to Step S202, pairing processing prescribed by Bluetooth (registered trademark) is executed between the communication control device 20*d* and guest terminal 30. More specifically, at Step S200, the communication control device 20*d* notifies of information indicating the communication control device 20*d* itself in order to search for a connection destination by the short distance communication unit 215. When the guest terminal 30 is in a distance range allowing short distance communication with the communication control device 20*d* and the short distance communication unit 315 is in a searchable state, the guest terminal 30 receives this notification (Step S201).

When the guest terminal 30 receives, through the short distance communication unit 315, the notification transmitted by the communication control device 20 through the short distance communication unit 215, in response to the received notification, the guest terminal 30 transmits a connection request to the communication control device 20*d* (Step S202). When this connection request is received by the communication control device 20*d*, the short distance communication unit 215 and short distance communication unit 315 execute connection establishment processing via short distance wireless communication between the communication control device 20*d* and guest terminal 30 (Step S203).

When the connection through short distance wireless communication is established between the communication control device 20*d* and guest terminal 30 by the short distance communication unit 215 and short distance communication unit 315, the communication control device 20*d* transmits, through the short distance communication unit 215, to the guest terminal 30, connection information used for the guest terminal 30 to perform communication with the communication control device 20*d* via the wireless LAN (Step S204). The guest terminal 30 receives this connection information. In the guest terminal 30, the short distance communication unit 315 transfers the received connection information to the communication control unit 314 that performs control of the wireless LAN communication (Step S205).

The connection information includes, for example, identification information and a password, of the guest AP 41 connected to the communication control device 20*d*. Specific examples of the identification information and password of the guest AP 41 are the Extended Service Set ID (ESSID) and Pre-Shared Key (PSK) when the communication method is, for example, WPA2 Personal.

Further, in the communication control device 20*d*, when the short distance communication unit 215 establishes the connection with the short distance communication unit 315 in Step S203, the short distance communication unit 215 requests the connection control unit 213' to connect the guest AP 41 to the communication control unit 214 (Step S206). In response to this request, the connection control unit 213' connects the guest AP 41 communicatably to the communication control unit 214. Although the processing of Step S206 is illustrated to be executed after the processing of Step S204 in the example of FIG. 20, not being limited to this example, the processing of Step S206 may be executed between Step S203 and Step S204.

The communication control unit 314 establishes connection through the wireless LAN to the guest AP 41 using the connection information transferred from the short distance communication unit 315 in Step S205 (Step S207). When the connection between the communication control unit 314 and guest AP 41 is established, mutual communication between the guest terminal 30 and guest AP 41 is enabled (Step S208). Since the guest AP 41 and communication control unit 214 are communicatably connected by the above described connection request of Step S206, the guest terminal 30 is connected by the communication control unit 314 to the network 10 via the guest AP 41, connection control unit 213' and communication control unit 214 (Step S209 to Step S211).

As described above, according to the second embodiment, by the guest terminal 30 entering the communicatable range of the short distance communication unit 215 of the communication control device 20d, connection information for the guest terminal 30 to establish connection through the wireless LAN to the guest AP 41 is transmitted from the communication control device 20d to the guest terminal 30 through short distance wireless communication. By setting the communicatable range of short distance wireless communication for transmitting the connection information to a range of about one meter from a communication position in short distance wireless communication of the communication control device 20d, for example, the particular guest terminal 30 is able to be selectively connected to the network 10 without execution of a selection operation of the guest AP 41.

Modification of Second Embodiment

A modification of the second embodiment will be described. The modification of the second embodiment is an example, where each function executed on the communication control device 20d according to the second embodiment is configured based on the above described concept of SDN.

Figure 21:
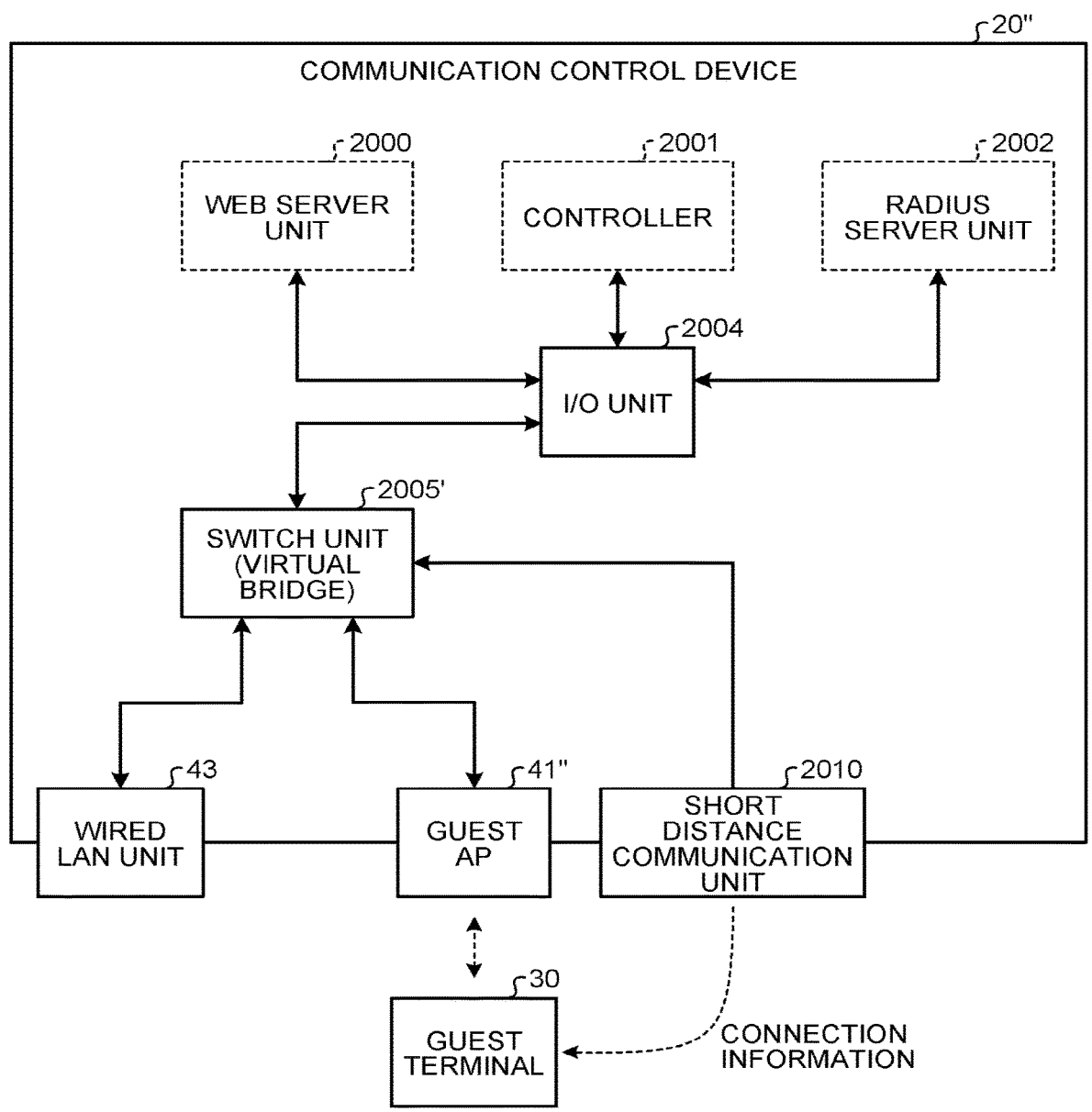
FIG. 21 is a functional block diagram of an example illustrating functions of a communication control device according to a modification of the second embodiment.

FIG. 21 is a functional block diagram of an example illustrating functions of a communication control device according to the modification of the second embodiment. In FIG. 21, the same elements as in FIG. 16 described above will be denoted by the same symbols and detailed description thereof will be omitted. The network system 1d according to the second embodiment described above is applicable to the modification of the second embodiment.

In FIG. 21, the authentication AP 40", host AP 42', and captive portal unit 2003 omitted from a communication control device 20", in contrast to the communication control device 20' illustrated in FIG. 16. Further, a short distance communication unit 2010 is added to the communication control device 20", in contrast to the communication control device 20' of FIG. 16. The short distance communication unit 2010 corresponds to the short distance communication unit 215 of FIG. 9, and is able to transmit, through short distance wireless communication, connection information for the guest terminal 30 to connect to the guest AP 41" through short distance wireless communication.

Further, in FIG. 21, a switch unit 2005' corresponds to the connection control unit 213' of FIG. 19, and is able to, in response to a connection request from the short distance communication unit 2010, control behavior of a relayed packet. For example, according to the connection request received from the short distance communication unit 2010 in Step S206 of FIG. 20, the switch unit 2005' rewrites information indicating a transfer destination of a packet supplied from the guest AP 41", such that the transfer destination becomes a device connected via the wired LAN unit 43 and network 10.

In such a configuration, between the short distance communication unit 2010 of the communication control device 20" and the short distance communication unit 315 of the guest terminal 30, the processing of Step S200 to Step S203 of FIG. 20 is executed, and connection between the short distance communication unit 2010 and short distance communication unit 315 through short distance wireless communication is established. The short distance communication unit 2010 transmits, to the guest terminal 30, connection information for the guest terminal 30 to connect to the guest AP 41" (Step S204 in FIG. 20). The connection information is received by the guest terminal 30. In the guest terminal 30, the short distance communication unit 315 transfers the received connection information to the communication control unit 314 (Step S205 in FIG. 20).

The communication control unit 314 establishes connection through the wireless LAN to the guest AP 41" using the connection information transferred from the short distance communication unit 315 (Step S207 in FIG. 20). Thereby, the guest terminal 30 is able to connected to the network 10 via the guest AP 41", switch unit 2005', and wired LAN unit 43 and is enabled to perform communication with a device on the network 10 (Step S208 to Step S211).

According to the modification of the second embodiment, since the OpenFlow as in the configuration according to the first embodiment is applied to the second embodiment, without a selection operation of the guest AP 41", a system is able to be more flexibly and easily configured, the system enabling the particular guest terminal 30 to be selectively connected to the network 10.

Other Modification of Second Embodiment

The network system 1b described in the first modification of the first embodiment, or the network system 1c described in the second modification of the first embodiment, may be applied to the above described second embodiment.

According to an embodiment, an effect that easy connection to a specific access point of plural access points is enabled is achieved.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A communication system comprising:
   a terminal device; and
   a communication device,
   the communication device comprising:
      a first communication interface configured to perform communication with the terminal device through first wireless communication based on connection information;
      a second communication interface configured to perform communication via a network; and
      processing circuitry configured to permit the terminal device, which performs communication with the first communication interface based on the connection information, to connect to the network via the second communication interface, the terminal device comprising:
      a third communication interface configured to perform the first wireless communication;
      a fourth communication interface configured to perform second wireless communication having a communication range smaller than the first wireless communication, the second wireless communication being near field radio communication (NFC); and
      processing circuitry configured to cause the third communication interface to transmit the connection information received by the fourth communication interface, to the first communication interface,
      wherein the connection information includes a Service Set Identifier (SSID), the fourth communication interface obtains the connection information through the NFC communication, and the third communication interface connects with a wireless LAN access point using the connection information and performs the first wireless communication,
   wherein the processing circuitry of the communication device is further configured to
      perform communication according to the hypertext transfer protocol (HTTP) to transmit a Web page to the terminal device;
      write, in a flow table, transfer control information indicating a transfer destination of authentication information input in the Web page and received from the terminal device,
      transmit the authentication information to a host terminal according to a flow table written by the processing circuitry, and in response to receiving authentication validation information after authentication is performed in the host terminal, and permit connection by the terminal device to the network via the second communication interface, and
   the terminal device includes processing circuitry configured to transmit, to the communication device, the authentication information input in the Web page received from the communication device.

2. The communication system according to claim 1, wherein the communication device further comprises a fifth communication interface configured to transmit the connection information through the second wireless communication.

3. The communication system according to claim 2, wherein if connection between the fourth communication interface and the fifth communication interface is established and the connection information is transmitted from the fifth communication interface to the fourth communication interface, the processing circuitry permits the terminal device to connect to the network via the second communication interface.

4. The communication system according to claim 1, further comprising a short-distance communication device, separate from the communication device, that includes a fifth communication interface configured to transmit the connection information through the second wireless communication.

5. The communication system according to claim 1, wherein the NFC communication provides a communication range of one meter or less.

6. A non-transitory recording medium including a computer program to be executed by a computer installed in a communication device of a communication system including a terminal device and the communication device, wherein
   the terminal device comprises a first communication interface configured to perform first wireless communication, a second communication interface configured to perform second wireless communication having a communication range smaller than the first wireless communication, and processing circuitry configured to cause the first communication interface to transmit connection information received by the second communication interface, the second wireless communication being near field radio communication (NFC) which provides a communication range of one meter or less,
   the computer program causes the computer to perform:
      through a third communication interface configured to perform communication through the second wireless communication, transmitting the connection information;
      through a fourth communication interface configured to perform communication through the first wireless communication, performing communication with the terminal device based on the connection information transmitted by the first communication interface; and
      permitting the terminal device, which performs communication with the fourth communication interface based on the connection information, to connect to a network via a fifth communication interface, and
      at the permitting, the terminal device is permitted to connect to the network via the fifth communication interface if connection between the second communication interface and third communication interface is established and the connection information is transmitted from the third communication unit to the second communication interface,
   wherein the connection information includes a Service Set Identifier (SSID), the fourth communication interface obtains the connection information through the NFC communication, and the third communication interface connects with a wireless LAN access point using the connection information and performs the first wireless communication, wherein the method further includes
- performing communication according to the hypertext transfer protocol (HTTP) to transmit a Web page to the terminal device;
- writing, in a flow table, transfer control information indicating a transfer destination of authentication information input in the Web page and received from the terminal device,
- transmitting the authentication information to a host terminal according to a written flow table written, and in response to receiving authentication validation information after authentication is performed in the host terminal, and
- permitting connection by the terminal device to the network via the second communication interface, and the terminal device transmits, to the communication device, the authentication information input in the Web page received from the communication device.

* * * * *